US012179167B2

(12) United States Patent
Ender et al.

(10) Patent No.: US 12,179,167 B2
(45) Date of Patent: Dec. 31, 2024

(54) STRUCTURED PACKING FOR GAS PHASE REACTOR

(71) Applicant: Julius Montz GmbH, Hilden (DE)

(72) Inventors: Christoph Ender, Hilden (DE); Robin Schulz, Hilden (DE); Thorsten Erik Alexander Hugen, Hilden (DE)

(73) Assignee: Julius Montz GmbH, Hilden (DE)

( * ) Notice: Subject to any disclaimer, the term of this patent is extended or adjusted under 35 U.S.C. 154(b) by 0 days.

(21) Appl. No.: 17/863,398

(22) Filed: Jul. 13, 2022

(65) Prior Publication Data

US 2023/0028694 A1 Jan. 26, 2023

(30) Foreign Application Priority Data

Jul. 13, 2021 (EP) ..................................... 21185414

(51) Int. Cl.
*B01J 19/32* (2006.01)
*B01J 15/00* (2006.01)

(52) U.S. Cl.
CPC ............. *B01J 19/32* (2013.01); *B01J 15/005* (2013.01); *B01J 2219/3221* (2013.01); *B01J 2219/3222* (2013.01); *B01J 2219/32227* (2013.01); *B01J 2219/32268* (2013.01); *B01J 2219/32272* (2013.01); *B01J 2219/32279* (2013.01); *B01J 2219/32408* (2013.01); *B01J 2219/32466* (2013.01); *B01J 2219/3306* (2013.01)

(58) Field of Classification Search
CPC .. B01J 19/32; B01J 15/005; B01J 2219/3221; B01J 2219/3222; B01J 2219/32227; B01J 2219/32268; B01J 2219/32272; B01J 2219/32279; B01J 2219/32408; B01J 2219/32466; B01J 2219/3306; B01J 2219/3322; B01J 2219/3325
See application file for complete search history.

(56) References Cited

U.S. PATENT DOCUMENTS 3,727,384 A 4/1973 Feidman
3,862,280 A 1/1975 Polovina
(Continued)

FOREIGN PATENT DOCUMENTS

EP 0201614 A1 11/1986
EP 0300506 B1 6/1995
(Continued)

OTHER PUBLICATIONS

Extended European Search Report received for EP Application No. 21185414.6, mailed on Dec. 1, 2021, 07 Pages.

*Primary Examiner* — Lessanework Seifu

(57) ABSTRACT

A structured packing module for a gas phase reactor has a structured packing with a central axis extending along a longitudinal direction, and may further include an inner tube extending coaxially with the structured packing and along the longitudinal direction. The structured packing includes a plurality of corrugated sheets, each arranged circumferentially around the central axis and having a first end and a second end spaced apart from each other along the longitudinal direction. The corrugated sheets are arranged to radially overlap with each other such that corrugations of adjacently disposed corrugated sheets are arranged in a crisscross relationship. The structured packing module includes a gas flow path comprising at least one inter-sheet gas flow path defined between the adjacently disposed corrugated sheets.

21 Claims, 11 Drawing Sheets

(56) References Cited

U.S. PATENT DOCUMENTS

| | | |
|---|---|---|
| 4,296,050 A | 10/1981 | Meier et al. |
| 4,340,501 A | 7/1982 | Davidson |
| 4,497,751 A | 2/1985 | Pluss |
| 4,597,916 A | 7/1986 | Chen |
| 4,604,247 A | 8/1986 | Chen et al. |
| 4,634,534 A | 1/1987 | Cominetta et al. |
| 4,643,853 A | 2/1987 | Braun |
| 4,670,196 A | 6/1987 | Hsia |
| 4,670,197 A | 6/1987 | Stackhouse |
| 4,676,934 A | 6/1987 | Seah |
| 4,740,334 A | 4/1988 | Rukovena, Jr. |
| 4,950,430 A | 8/1990 | Chen et al. |
| 5,124,086 A | 6/1992 | Schultz |
| 5,132,056 A | 7/1992 | Lockett et al. |
| 5,167,879 A | 12/1992 | Streng |
| 5,413,741 A | 5/1995 | Buchholz |
| 5,454,988 A | 10/1995 | Maeda |
| 5,510,170 A | 4/1996 | Moore |
| 5,550,298 A | 8/1996 | Shelden et al. |
| 5,616,289 A | 4/1997 | Maeda |
| 8,361,432 B2 | 1/2013 | Parekh et al. |
| 8,663,596 B2 | 3/2014 | Garg et al. |
| 10,464,041 B2 | 11/2019 | Lambert et al. |
| 2004/0140577 A1 | 7/2004 | Ringo et al. |
| 2011/0182802 A1 | 7/2011 | Garg et al. |
| 2011/0226360 A1 | 9/2011 | Lebain et al. |

FOREIGN PATENT DOCUMENTS

| | | |
|---|---|---|
| FR | 2086365 A1 | 12/1971 |
| WO | 9101178 A1 | 2/1991 |

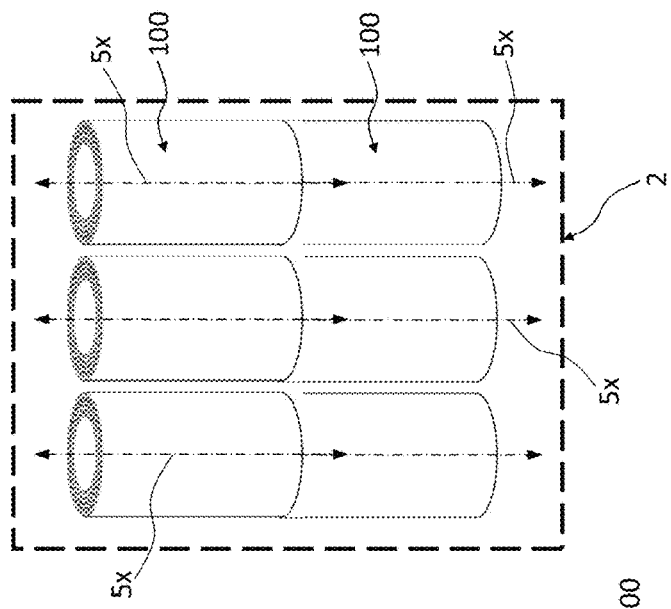
Fig. 17
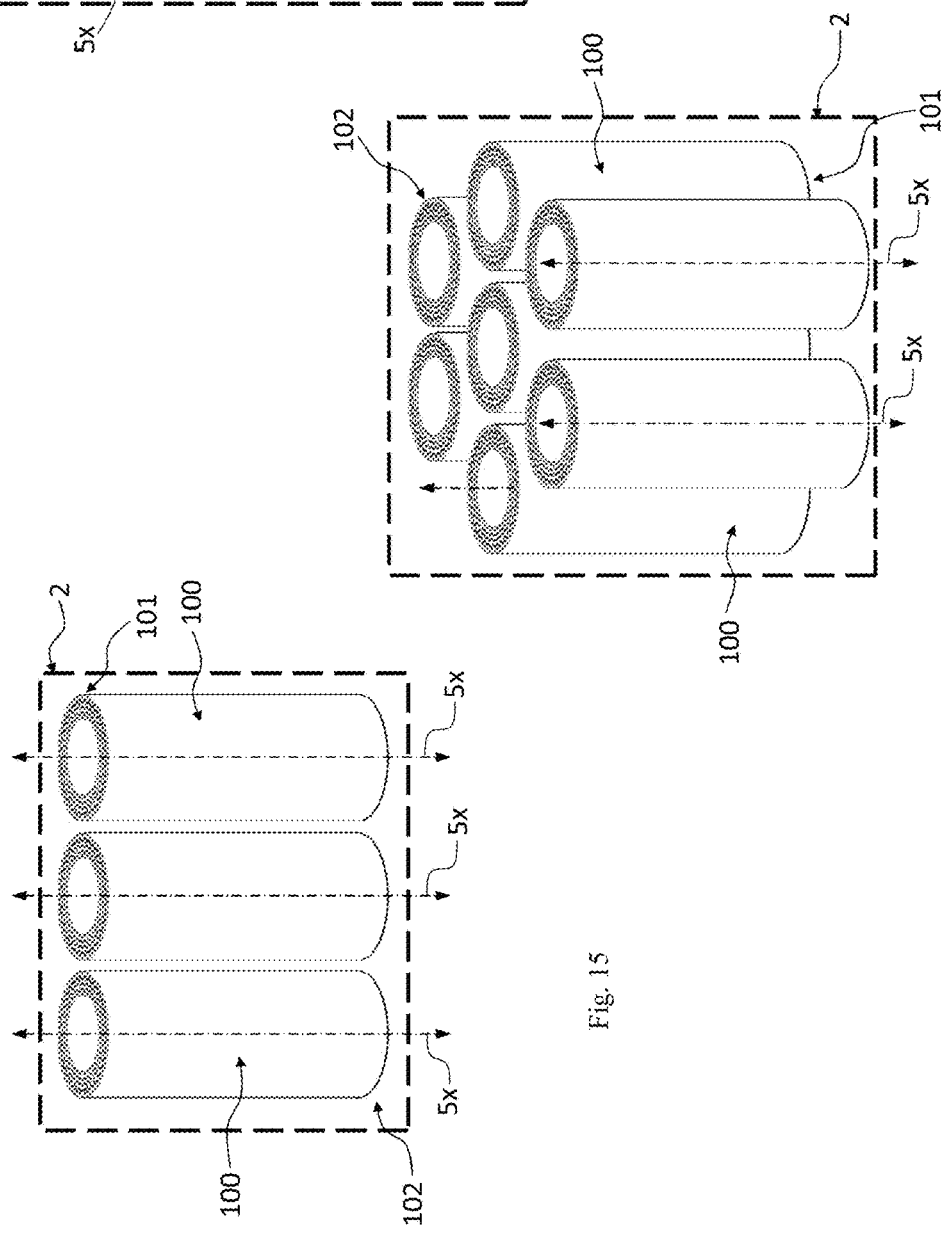
Fig. 16
Fig. 15

STRUCTURED PACKING FOR GAS PHASE REACTOR

RELATED APPLICATIONS

This application claims priority to EP Application No. 21185414.6, filed on Jul. 13, 2021, which is incorporated herein by reference in its entirety.

FIELD OF THE INVENTION

The present invention relates to structured packing for a gas phase reactor, and gas phase reactor including structured packing.

BACKGROUND OF THE INVENTION

The gas phase reactors are chemical reactors in which reactants are received in gaseous or vapor state and at least one of the products in gaseous or vapor state is generated in the reactor, by a chemical reaction between the reactants (with or without a catalyst), for example steam reforming. The primary reactants, e.g., all of the reactants, may be supplied into the reactor in gaseous or vapor state in form of an input feed. Such reactors include a gas flow path in which the reactants flow and chemically react with each other while flowing through the flow path to generate one or more reaction products in gaseous or vapor state. The generated product then flows out of the reactor as an output or yield of the reactor.

The seat of the reaction, i.e., space where the reaction takes place, is the space of the gas flow path. Such reaction(s), and thus the yield, are influenced by characteristics of the space of the gas flow path, for example rate of flow through the gas flow path, dynamics of flow, e.g., mixing between the reactants, and so on and so forth.

Furthermore, for reactions that use one or more catalysts, such catalysts—one or more or all—are provided in the gas flow path to physically contact the reactants flowing through the gas flow path. Generally, the catalysts are provided as or on small structures, such as pellets, that are disposed in the gas flow path of the reactor. The yield is influenced by the amount of physical contact between the reactants and the catalyst.

Moreover, it is also desirable to keep the flow rate optimum, and not make it too slow, to keep the yield higher.

Thus, it is desirable to have a gas flow path which implements optimized mixing of the reactants flowing through the gas flow path, while having optimum flow rate—neither too slow nor too fast. On one hand, a flow rate slower than optimal can achieve higher utilization of reactants but rate of production will be low, on the other hand a flow rate higher than optimal can result in outputting of unreacted reactants and thus efficiency will be low.

Therefore, it is an object of the present invention to provide a technique for effecting optimal interaction between the reactants without unduly retarding the flow of the reactants through the gas flow path. Another object would be to promote contact of the reactants with the catalyst, in case of reactions that are catalytically aided without unduly retarding the flow of the reactants through the gas flow path.

SUMMARY OF THE INVENTION

One or more of the above objects are achieved by a structured packing module according to the independent claim(s). A gas phase reactor including the structured packing module is also presented. Advantageous embodiments of the present technique are provided in dependent claims. Features of independent claim may be combined with features of claims dependent on the independent claim, and features of dependent claims can be combined with each other.

According to an aspect of the present technique a structured packing module for a gas phase reactor is presented. The gas phase reactor includes, but is not limited to, a chemical reactor in which input feed is received in form of at least one gas.

The gas phase reactors may be understood as chemical reactors in which reactants are received in gaseous or vapor state and at least one of the products in gaseous or vapor state is generated in the reactor, by a chemical reaction between the reactants (with or without a catalyst), for example steam reforming. The gas phase reactors may be configured for only gaseous or vapor state reactants.

The gas phase reactor includes a chemical reactor in which input feed is received in gaseous form only, i.e., in which feed input is received in form of only one gas or in form of plurality of gases, e.g., no liquid reactants are introduced. The structured packing module of the present technique may be especially advantageous in such gas reactors by facilitating reaction within the reactor by promoting mixing of the reactants and/or by promoting contact between the one or more reactants and any catalyst that may be present inside the structured packaging module.

The structured packing module includes a structured packing having a central axis extending along a longitudinal direction. The structured packing module optionally includes an inner tube. In the structured packing module, a plurality of corrugated sheets and a gas flow path may be defined. The structured packing module optionally includes an outer sleeve. The inner tube may have a central axis, same as the central axis of the structured packing, extending along the longitudinal direction, in other words the central axis of the structured packing and/or the inner tube defines a longitudinal or lengthwise direction of the structured packing and/or the inner tube and thus of the structured packing module. For example, when the structured packing is disposed in an upright position, the central axis may be vertically disposed and thus the longitudinal direction is vertical direction. In the present technique all references to 'central axis' may be understood as of the structured packing and/or of the inner tube and/or of the structured packing module, unless expressly stated otherwise. The inner tube and/or the structured packing and/or the outer tube may have the same central axis.

Each corrugated sheet includes a first end and a second end spaced apart from each other along the longitudinal direction of the of the inner tube.

Each corrugated sheet comprises corrugations linearly extending between the first end and the second end, e.g., starting at the first end or edge and extending up to the second end or edge, for example extending along a lengthwise direction of the corrugation.

In each corrugated sheet, corrugations are disposed at an acute angle with respect to a line parallel to the central axis, wherein the acute angle is greater than or equal to 5 degrees and less than or equal to 30 degrees.

When the central axis of the structured packing and/or the inner tube is aligned vertically, then an angle (say corrugations-horizontal plane angle) formed between a horizontal plane and the corrugations may be greater than or equal to 60 degrees and less than or equal to 85 degrees. For a pair of adjacently disposed corrugated sheets, the corrugations-horizontal plane angle may be measured from the horizontal plane in counterclockwise sense for one of the adjacently disposed corrugated sheets and the corrugations-horizontal plane angle may be measured from the horizontal plane in clockwise sense for another of the adjacently disposed corrugated sheets. Another understanding the acute angle may be that the acute angle is an angle formed when the corrugated sheet is in an unfolded state or flat state.

The acute angle may be greater than or equal to 5 or 10 degrees and less than or equal to 15 or 20 degrees.

When the central axis of the structured packing and/or the inner tube is aligned vertically, then an angle (i.e., the corrugations-horizontal plane angle) formed between a horizontal plane and the corrugations may be greater than or equal to 70 or 75 degrees, and less than or equal to 80 or 85 degrees.

The acute angle may be 10 degrees. When the central axis of the structured packing and/or the inner tube is aligned vertically, then an angle (i.e., the corrugations-horizontal plane angle) formed between a horizontal plane and the corrugations may be 80 degrees.

The acute angle may be 5 degrees. When the central axis of the structured packing and/or the inner tube is aligned vertically, then an angle (i.e., the corrugations-horizontal plane angle) formed between a horizontal plane and the corrugations may be 85 degrees.

In the present technique, 'adjacently disposed' means 'disposed directly adjacent to', i.e., 'directly adjacently disposed', unless otherwise stated.

The corrugations include crests and troughs. Optionally, the crests and troughs may extend linearly, or only linearly. In other words, a topological skeleton of the crests may extend only linearly, and a topological skeleton of the troughs may extend only linearly. The topological skeletons of the crests and the troughs may be alternatingly disposed and may be parallel to each other. The crests and troughs of the corrugations may extend linearly between the first end and the second end of each corrugated sheet.

The crests and troughs of the corrugations may extend linearly from the first end up to the second end of each corrugated sheet. In other words, the crests and troughs of the corrugations may be contiguous with the first end and with the second end of each corrugated sheet, and may extend continuously from the first end to the second end of the corrugated sheet.

In each corrugation sheet, all the crests may be parallelly aligned, and/or all the troughs may be parallelly aligned, and/or the crests may be parallelly aligned to the troughs.

The crests and troughs of the corrugations may be parallel to each other.

In other words, a straight line extending along a peak or crest or ridge of the corrugations from the first end to the second end (say a crest-line or topological skeleton of a crest) defines the acute angle with the line parallel to the central axis of the structured packing and/or the inner tube. The crest-line and the line parallel to the central axis of the structured packing and/or the inner tube intersect each other at a surface of the corrugated sheet.

To explain further, a straight line extending along a trough or furrow of the corrugations from the first end to the second end (say a trough-line or topological skeleton of a trough) defines the acute angle with the line parallel to the central axis of the structured packing and/or the inner tube. The trough-line and the line parallel to the central axis of the structured packing and/or the inner tube intersect each other at a surface of the corrugated sheet.

The corrugations may be formed uniformly around a circumferential direction of the corrugated sheet, i.e., when moving along the circumferential direction the crests and troughs are uniformly formed, i.e., apex angle or opening angle of the crests is same as apex angle or opening angle of the troughs, when viewed along a radial direction.

The corrugated sheets may be of uniform or constant thickness.

The thickness of each of the corrugated sheets may be the same.

The corrugated sheets are arranged to radially overlap with each other such that the corrugations of adjacently disposed corrugated sheets are arranged in a crisscross relationship, when viewed radially.

The gas flow path of the structured packing may extend in the longitudinal direction and may be defined radially in-between the corrugated sheets. The gas flow path of the structured packing module may extend in the longitudinal direction and may be defined radially outward of the inner tube. The gas flow path may have an annular shape, when cross-sectional the plane is perpendicular to the central axis of the structured packing and/or the inner tube.

The gas flow path of the structured packing module may form a seat of a chemical reaction, i.e., the reactant or reactants may undergo the chemical reaction, with or without a catalyst, to form one or more products while flowing through the gas flow path of the structured packing module. The corrugated sheets are disposed in the gas flow path.

The gas flow path of the structured packing module may include at least one inter-sheet gas flow path defined between the adjacently disposed corrugated sheets. Each pair of adjacently disposed corrugated sheets may define one inter-sheet gas flow path thereinbetween, for example with three corrugated sheets, two inter-sheet gas flow paths may be realized. The inter-sheet gas flow path may have an annular shape, when the cross-sectional plane is perpendicular to the central axis of the inner tube.

The inter-sheet gas flow paths may be in fluid communication with each other, for example via radially extending though-holes included in one or more of the corrugated sheets. Alternatively, the inter-sheet gas flow paths may be in fluidly isolated or separate or disconnected from each other.

The gas flow path may also optionally include an inner gas flow path defined between a radially inner-most corrugated sheet (of the plurality of corrugated sheets) and an outer surface, i.e., the curved surface or the outer circumferential surface of the inner tube. The inner gas flow path may have an annular shape, when the cross-sectional plane is perpendicular to the central axis of the inner tube. The inner gas flow path may be disposed radially inwards of the inter-sheet gas flow path(s).

The radially inner-most corrugated sheet may be in direct contact with the inner tube, for example the radially inner-most corrugated sheet may be directly fixed to the inner tube, for example to the outer circumferential surface of the inner tube. For example, the corrugated sheet may be directly fixed to the inner tube by welding or brazing or interference-fitting the corrugated sheet directly to the inner tube.

The outer circumferential surface of the inner tube may be smooth. Alternatively, the outer circumferential surface of the inner tube may be textured, for example may include ribs, dimples, dots, turbulators or surface treatments to make the surface rough.

The gas flow path may also optionally include an outer gas flow path defined between a radially outer-most corrugated sheet (of the plurality of corrugated sheets) and an inner surface, i.e. curved surface or inner circumferential surface of the outer tube. The outer gas flow path may have an annular shape, when the cross-sectional plane is perpendicular to the central axis of the inner tube. The outer gas flow path may be disposed radially outwards of the inter-sheet gas flow path(s).

The radially outer-most corrugated sheet may be in direct contact with the outer tube, for example the radially outermost corrugated sheet may be directly fixed to the outer tube, for example to the inner circumferential surface of the outer tube. For example, the corrugated sheet may be directly fixed to the outer tube by welding or brazing or interference-fitting the corrugated sheet directly to the outer tube.

The inner circumferential surface of the outer tube may be smooth. Alternatively, the inner circumferential surface of the outer tube may be textured, for example may include ribs, dimples, dots, turbulators or surface treatments to make the surface rough.

In the plurality of corrugated sheets, each pair of adjacently disposed corrugated sheets may be directly fixed to each other, for example by direct contact the corrugated sheets. For example, by direct contact between the surfaces of the corrugated sheets radially facing each other. The corrugated sheets may be directly fixed to each other by welding or brazing or interference-fitting the corrugated sheet directly to each other.

Simply put, each corrugated sheet may be fixed to a radially adjacently disposed corrugated sheet, or to radially adjacently disposed corrugated sheets, by directly contacting the radially adjacently disposed corrugated sheet or sheets, for example by welding or brazing or interference-fitting.

In the present technique, terms like 'radial', 'radially', 'radially outward', 'radially-outward', 'radially inward', 'radially-inward', 'radial direction', 'axial', 'axially', 'axially outward', 'axially-outward' 'axially inward', 'axially-inward', 'axial direction', 'circumferentially', 'circumferential direction' and like terms are defined with respect to the central axis of the structured packing and/or of the inner tube, unless expressly stated otherwise.

The structured packing may have a nested structure or tube-in-tube structure.

Each corrugated sheet is arranged circumferentially around the inner tube.

The inner tube may be completely circumferentially surrounded by the corrugated sheet.

The corrugated sheet when viewed axially may completely circumferentially enclose the inner tube. Optionally, the corrugated sheet when viewed radially may be completely inserted into the inner tube and/or the outer tube.

The corrugated sheet may be understood as a structure which when viewed axially has a wavy or wave-like periphery or cross-section or contour.

The corrugated sheet may have a structure, e.g., a single sheet structure or a monolayer structure, having flutes or corrugations exposed on both sides, i.e., without having any flat liner sheet adhering to the flutes or the corrugations. In other words, flutes or corrugations are exposed on both— radially—inward facing surface and radially—outward facing surface (on the flip side of the radially—inward facing surface) of the corrugated sheet.

In other words, each corrugated sheet comprises a plurality of first parts and a plurality of second parts, arranged in an alternating manner. The first parts form the crests and the second parts form the troughs, when viewed in radially-inwards direction, and second first parts form the troughs and the second parts form the crests, when viewed in radially-outwards direction, The corrugated sheet may have a cylindrical or tubular shape.

The corrugated sheets, or the corrugated sheets and the inner tube together, form a nested multi-tubular structure. The corrugated sheets and the inner tube may all be coaxial.

The crests and troughs of each corrugated sheet may have same dimensions.

A radial spacing between adjacently spaced corrugated sheets of the plurality of corrugated sheets may be same or uniform.

A radial spacing between a radially innermost corrugated sheet of the plurality of corrugated sheets and the inner tube, e.g., an outer circumferential surface of the inner tube, may be same as the radial spacing between adjacently spaced corrugated sheets.

A radial spacing between a radially outermost corrugated sheet of the plurality of corrugated sheets and the outer tube, e.g., an inner circumferential surface of the outer tube, may be same as the radial spacing between adjacently spaced corrugated sheets.

The outer tube may be coaxially arranged with the structured packing and/or the inner tube and radially spaced apart from the structured packing and/or the inner tube—to define an annular space thereinbetween. The gas flow path may be defined in the annular space, i.e., by the inner circumferential surface of the outer tube and the outer circumferential surface of the inner tube. The plurality of corrugated sheets may be disposed in the annular space, i.e., between the inner circumferential surface of the outer tube and the outer circumferential surface of the outer tube. The corrugated sheets may be disposed in the gas flow path by the inner circumferential surface of the outer tube and the outer circumferential surface of the inner tube.

A radially-inward facing surface and/or a radially-outward facing surface of the corrugated sheet may be smooth or textured.

A surface of the corrugated sheet may be coated with at least one catalyst. For example, the catalyst may be disposed on any one (radially-inward facing surface or radially-outward facing surface) or both surfaces (radially-inward facing surface and radially-outward facing surface) of the corrugated sheet facing the inner tube and facing away from the inner tube, when viewed radially.

The corrugation of the corrugated sheet may be defined with a crimp angle, also referred to as apex angle or opening angle.

The crimp angle (or apex angle or opening angle) may be understood as an angle between surface regions of the corrugated sheet that define a crest or a trough of the corrugation.

To explain further, a trough of the corrugated sheet may have two surface regions or portions facing each other and a bottom region (when viewed radially) between the two surface regions, and the crimp angle may be understood as the angle between the two surface regions facing each other.

The crimp angle of the corrugations may be less than equal to 60 degrees, and/or the crimp angle of the corrugations may be less than equal to 45 degrees; and/or the crimp angle of the corrugations is greater than equal to 40 degrees.

The plurality of corrugated sheets includes at least two corrugated sheets, however, the plurality may include more than two corrugated sheets, i.e., for example greater than or equal to two corrugated sheets and less than or equal to ten corrugated sheets.

The plurality of corrugated sheets may at least include a first corrugated sheet, a second corrugated sheet disposed radially outwards of the first corrugated sheet, and a third corrugated sheet disposed radially outwards of the second corrugated sheet. In other words, the second corrugated sheet may be disposed radially between the first and the third corrugated sheets.

The first and the third corrugated sheets may be arranged to radially overlap with each other such that the corrugations of the first and the third corrugated sheets are in parallel relation with each other, for example when viewed radially.

The first and the third corrugated sheets may be arranged to radially overlap with each other such that the corrugations of the first and the third corrugated sheets overlap with each other, for example when viewed radially.

The second corrugated sheet may be arranged to radially overlap with the first and/or the third corrugated sheets such that the corrugations of the second corrugated sheet may be in a crisscross relationship with the corrugations of the first and/or the third corrugated sheets, for example when viewed radially.

In general, each pair of directly adjacently disposed corrugated sheet is arranged to implement the crisscross relationship. For example, if there are five corrugated sheets, namely first to fifth in radially outward direction from the inner tube, then the first and the second form a pair and are arranged to implement the crisscross relationship, the second and the third form another pair and are arranged to implement the crisscross relationship, the third and the fourth form yet another pair and are arranged to implement the crisscross relationship, and the fourth and the fifth form the last pair and are arranged to implement the crisscross relationship.

For each structured packing, the first ends of the corrugated sheets may define an input end of the gas flow path, i.e., an inlet where a flow of reactants is received into the seat of reaction.

The first ends of the adjacently disposed pair of corrugated sheets may be arranged such that crests of one of the adjacently disposed corrugated sheets is in contact with troughs of other of the adjacently disposed corrugated sheets, for example when viewed radially.

The crests and the troughs of the corrugations may be contiguously disposed, i.e., there may not be any intermediate interconnecting part between the crests and the troughs. In other words, when moving along a circumferential direction, the surface of the corrugated sheet may have a continuous oscillating structure for example resembling a sine-wave form.

The peaks of the crests and/or bottoms of the troughs may have a rounded shape, i.e., without any sharp bends or edges.

A material of the corrugated sheets comprises metal, e.g., metallic alloy.

A material of the corrugated sheets comprises Fecralloy, for example the corrugated sheet may be made of Fecralloy or may be made only of Fecralloy.

A material of the corrugated sheets comprises Stainless Steel, for example the corrugated sheet may be made of Stainless Steel or may be made only of Stainless Steel.

A material of the corrugated sheets comprises Nickel, for example the corrugated sheet may be made of Nickel or may be made only of Nickel.

A thickness of the corrugated sheet may be greater than or equal to 0.1 millimeter and less than or equal to 0.2 millimeter.

A thickness of the corrugated sheet may be greater than or equal to 0.15 millimeter and less than or equal to 0.2 millimeter.

A thickness of the corrugated sheet may be greater than or equal to 0.15 millimeter and less than or equal to 0.18 millimeter.

A thickness of the corrugated sheet may be 0.15 millimeter.

The thickness may be understood as a distance between the radially-inward facing surface and the radially-outward facing surface of the corrugated sheet.

A radial distance of separation between the inner tube and the outer tube may be greater than or equal to 10 millimeters and less than or equal to 30 millimeters. As an example, a radial distance of separation between the inner tube and the outer tube may be greater than or equal to 10 millimeters and less than or equal to 20 millimeters.

A radial distance of separation between the inner tube and the outer tube may be greater than or equal to 15 millimeters and less than or equal to 20 millimeters.

A radial distance of separation between the inner tube and the outer tube may be greater than or equal to 15 millimeters and less than or equal to 18 millimeters.

A radial distance of separation between the inner tube and the outer tube may be 18 millimeters.

A height of the corrugated sheet or the structured packing may be greater than or equal to 150 millimeters (mm) and less than or equal to 370 mm, preferably may be 200 mm. Each of the corrugated sheets may have the same height.

A height of the inner tube and/or the outer tube may be greater than or equal to 0.5 meter and less than or equal to 12 meters, for example may be greater than or equal to 1 meter and less than or equal to 12 meters.

A height of the inner tube and/or the outer tube may be greater than or equal to 1 meter and less than or equal to 2 meters.

A height of the inner tube and/or the outer tube may be 1 meter.

A height of the inner tube and/or the outer tube may be 2 meters.

The 'height' of the corrugated sheets, the inner tube, and the outer tube may be measured axially.

The structed packing module may include one or more structured packings. For example, the structured packing module may include a plurality of the structured packings stacked atop each other along the longitudinal direction. In other words, the central axes of each of the structured packings of the plurality of structured packings may be aligned with each other (coaxially aligned) to form one structured packing module. Adjacent structured packings, along the longitudinal direction, may be in direct contact with each other. The corrugated sheets of one of the structured packings may be serially arranged along the longitudinal direction with corrugated sheets of an adjacent structured packing, preferably in direct contact with each other.

The height of the inner tube may be greater than each of the structured packings or of the corrugated sheets. A plurality of structured packings may be arranged with a single or one inner tube. The plurality of structured packings may be coaxially aligned with each other to extend along the height of the inner tube. The plurality of structured packings may be coaxially aligned with each other to have a total height same as the height of the inner tube. The central axes of each of the structured packings of the plurality of structured packings may be aligned (coaxially aligned) with the central axis of the inner tube to form one structured packing module. Adjacent structured packings, along the longitudinal direction, may be in direct contact with each other. The corrugated sheets of one of the structured packings may be serially arranged along the longitudinal direction with corrugated sheets of an adjacent structured packing, preferably in direct contact with each other. Each structured packing may be in contact, preferably radially, with the inner tube.

The height of the outer tube may be greater than each of the structured packings or of the corrugated sheets. A plurality of structured packings may be arranged with a single or one outer tube. The plurality of structured packings may be coaxially aligned with each other to extend along the height of the outer tube. The plurality of structured packings may be coaxially aligned with each other to have a total height same as the height of the outer tube. The central axes of each of the structured packings of the plurality of structured packings may be aligned (coaxially aligned) and with the central axis of the outer tube to form one structured packing module. Adjacent structured packings, along the longitudinal direction, may be in direct contact with each other. The corrugated sheets of one of the structured packings may be serially arranged along the longitudinal direction with corrugated sheets of an adjacent structured packing, preferably in direct contact with each other. Each structured packing may be in contact, preferably radially, with the outer tube.

The height of the inner tube may be same as the height of the outer tube.

The structured packing module may include one inner tube, one outer tube and a plurality of structured packing serially arranged along the longitudinal direction, preferably in direct contact with each other. The plurality of structured packings may be coaxially aligned with each other to extend along the height of the outer tube. The plurality of structured packings may be coaxially aligned with each other to have a total height same as the height of the inner and the outer tube. The central axes of each of the structured packings of the plurality of structured packings may be aligned (coaxially aligned) with the central axis of coaxially aligned inner and outer tubes to form one structured packing module. Adjacent structured packings, along the longitudinal direction, may be in direct contact with each other. The corrugated sheets of one of the structured packings may be serially arranged along the longitudinal direction with corrugated sheets of an adjacent structured packing, preferably in direct contact with each other. Each structured packing may be in contact, preferably radially, with the inner and the outer tube.

A height or amplitude of the corrugations of the corrugated sheet may be greater than or equal to 1 millimeter and less than or equal to 2 millimeters, and/or is 1.8 millimeters.

The height of the corrugations may be understood as a distance between a radially-outermost point of a peak or crest, and a radially-inner most point of an adjoining trough, when measured radially.

A surface area of the corrugated sheet may be greater than or equal to 750 m2/m3, and/or a surface area of the corrugated sheet may be less than or equal to 1900 m2/m3, and/or a surface area of the corrugated sheet may be equal to 1200 m2/m3, for example may be equal to 1000 m2/m3.

The inner tube may comprise a first opening laterally adjacent to the first ends of the corrugated sheets.

The inner tube may comprise a second opening laterally adjacent to the second ends of the corrugated sheets.

The first opening is longitudinally spaced apart from the second opening.

The first ends of the corrugated sheets may form an input end of the at least one structured packing module disposed. The input end may be disposed or defined radially outwards of the inner tube.

The input end may be configured to receive at least one reactant gas as an input feed into the at least one structured packing module such that the at least one reactant gas flows from the first ends towards the second ends of the corrugated sheets.

The second opening of the inner tube may be configured to receive at least one product gas exiting at the second ends of the corrugated sheets such that the at least one product gas flows from the second opening towards the first opening of the inner tube.

In other words, the reactant gas may be introduced at the input end at the first ends of the corrugated sheets, may flow towards the second ends of the corrugated sheet along the gas flow path of the structured packing module and may undergo a chemical reaction while flowing from the first end towards the second end to form at least one product gas, the product gas may then exit out of the second ends and make an about-turn or U-turn to enter the second opening of the inner tube and then flow towards the first opening of the inner tube.

The first opening of the inner tube may form an output end of the at least one structured packing module, the output end configured to output at least one product gas of the gas phase reactor out of the at least one structured packing module. In other words, the product gas flowing inside the inner tube from the second opening of the inner tube to the first opening of the inner tube exits out of first opening. Thus, an inlet (i.e., input end) and an outlet (i.e., output end) of the structured packing module may be defined adjacent to (or laterally adjacent to) the first ends of the structured packing module.

Alternatively, an innermost tube or sleeve may be disposed inside the inner tube, preferably coaxially. The product gas after exiting from the first opening may make an about-turn or U-turn to enter an opening of the innermost tube or sleeve disposed in the first opening and then flow into the innermost tube or sleeve towards longitudinally opposite end of the innermost tube or sleeve.

According to another aspect of the present technique, a gas phase reactor comprising at least one structured packing module is presented. The at least one structured packing module is according to above mentioned aspect of the present technique.

The gas phase reactor for example a reactor tank of the gas phase reactor may include one or more of the structured packing modules, for example two or more structured packing modules, for further example ten or more, as a further example in multiples of 2 or 5 or 10, e.g., 100 structured packing modules.

The structured packing modules, may be configured as drop-in inserts.

The central axis of the structured packing and/or of the inner tube of the at least one structured packing module may be vertically disposed in the gas phase reactor.

When the at least one structured packing module comprises a plurality of structured packing modules, the central axes of the inner tubes of the structured packing modules are disposed parallel to each other.

Optionally, the first ends of the corrugated sheets of the structured packings of the plurality of structured packing modules may be horizontally aligned with each other, i.e., may be disposed at a same horizontal level.

Simply put, the structured packing modules may be disposed horizontally next to each other.

Additionally, one or more of the structured packing modules may be disposed atop one or more of the structured packing modules. Each structured packing module disposed atop another structured packing module forming a column of serially disposed (in longitudinal direction) structured packing modules, such that the gas flow paths of the structured packing modules are aligned with each other.

The first ends of the corrugated sheets may be disposed at a higher position than the second ends of the corrugated sheets, or in other words, the first ends are the upper ends and the second ends are the lower ends. The structured packing module may be vertically disposed.

The first ends of the corrugated sheets are disposed at a lower position than the second ends of the corrugated sheets, or in other words, the first ends are the lower ends and the second ends are the upper ends. The structured packing module may be vertically disposed.

BRIEF DESCRIPTION OF THE DRAWINGS

The above-mentioned attributes and other features and advantages of the present technique and the manner of attaining them will become more apparent and the present technique itself will be better understood by reference to the following description of embodiments of the present technique taken in conjunction with the accompanying drawings, wherein:

FIG. 15 schematically illustrates an exemplary arrangement of the structured packing modules in a gas phase reactor;

FIG. 16 schematically illustrates another exemplary arrangement of the structured packing modules in a gas phase reactor;

FIG. 17 schematically illustrates yet another exemplary arrangement of the structured packing modules in a gas phase reactor.

Figure 2:
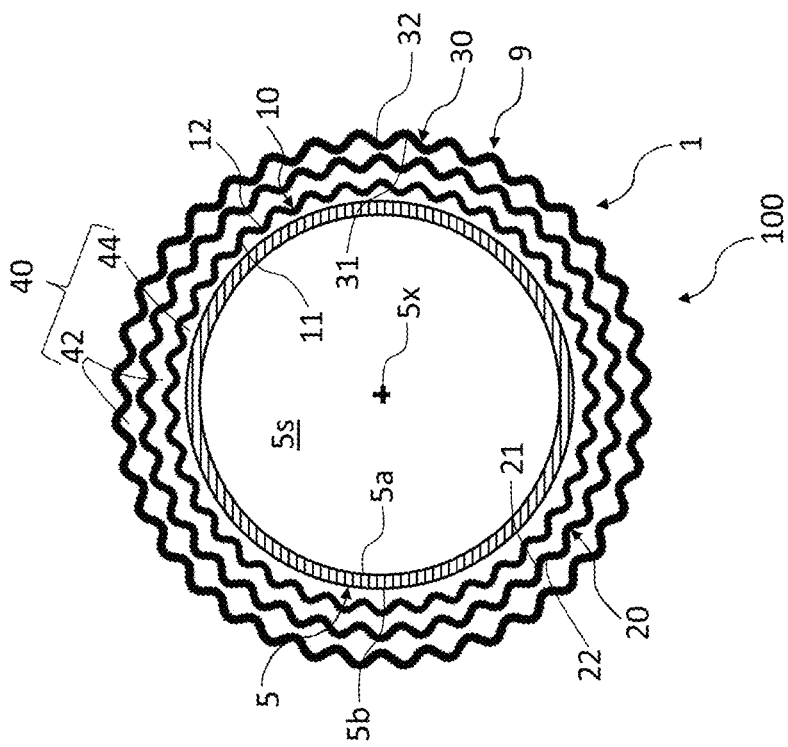
FIG. 2 schematically illustrates a cross-sectional view of the structured packing module at plane I-I of FIG. 1.

Hereinafter, above-mentioned and other features of the present technique are described in detail. Various embodiments are described with reference to the drawing, wherein like reference numerals are used to refer to like elements throughout. In the following description, for purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

Figure 1:
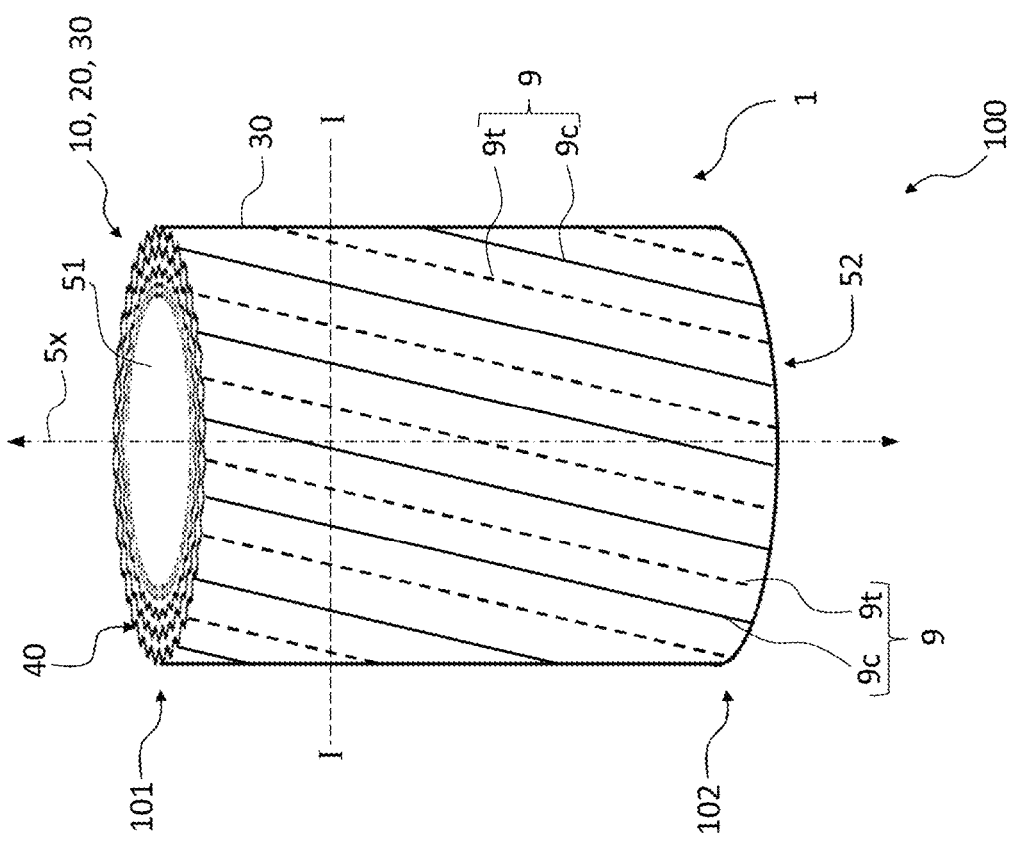
FIG. 1 schematically illustrates a perspective view of an exemplary structured packing module according to the present technique.

FIGS. 1 and 2 schematically show an exemplary embodiment of a structured packing module 100 according to the present technique. The structured packing module 100 includes a structured packing 1 and optionally includes an inner tube 5. The structured packing 1 has a plurality of corrugated sheets 10, 20, 30.

The structured packing 1 includes a plurality of corrugated sheets having a cylindrical shape, e.g., a right circular cylinder. The structured packing 1 has a central axis $5x$ representing a longitudinal direction of the structured packing 1 which may also be understood as central axis $5x$ of each of the cylindrical corrugated sheets 10, 20, 30. All the cylindrical corrugated sheets 10, 20, 30 may have the same central axis forming the central axis of the structured packing 1.

Figure 4:
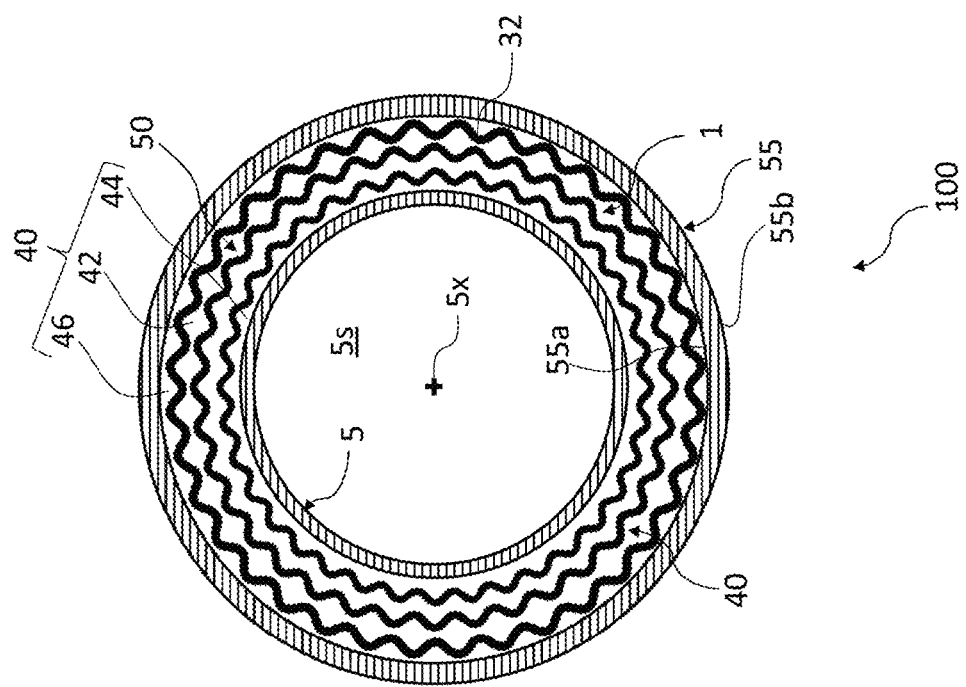
FIG. 4 schematically illustrates a cross-sectional view of the structured packing module at plane II-II of FIG. 3.
Figure 3:
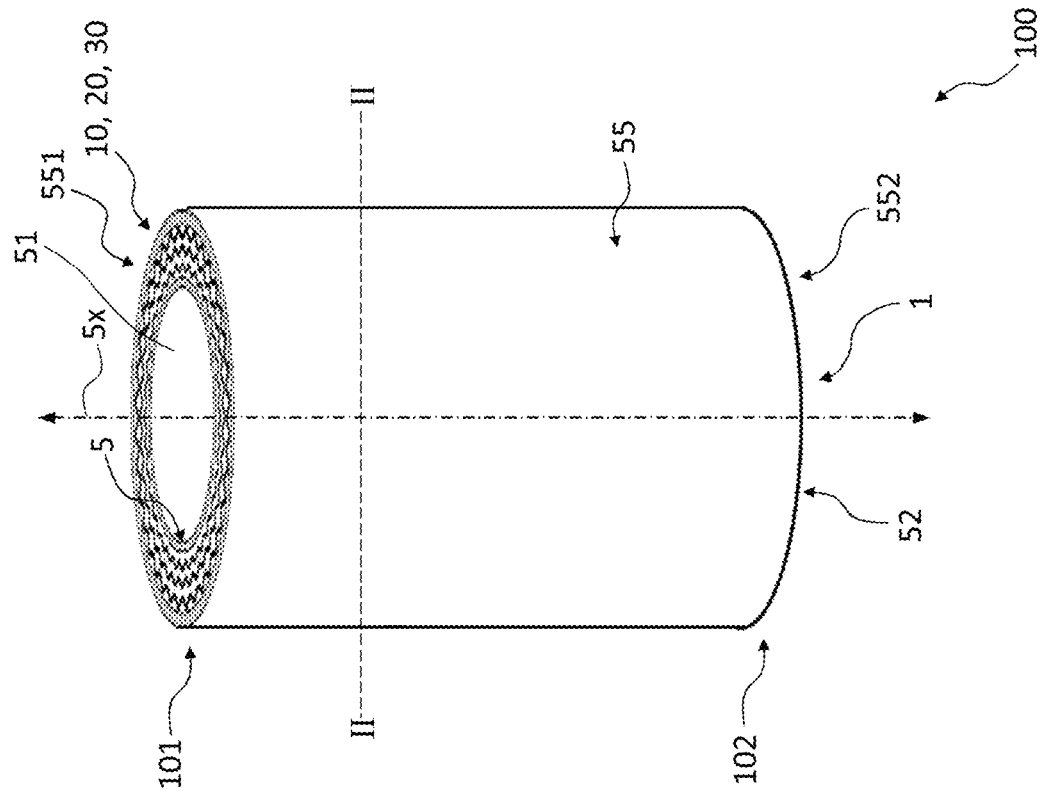
FIG. 3 schematically illustrates a perspective view of another exemplary structured packing module according to the present technique.

The structured packing module 100 may optionally include an outer sleeve 55. FIGS. 3 and 4 schematically show the structured packing module 100 with the outer sleeve 55. An annular space 50 may be defined between the inner tube 5 and the outer tube 55, for example between an outer circumferential surface $5b$ of the inner tube and an inner circumferential surface $55a$ of the outer tube 55. FIG. 14 shows a vertical cross-section of the structured packing module 100 with the outer sleeve 55, but the disclosure of remaining components of FIG. 14 is also applicable to a structured packing module 100 without the outer sleeve 55.

The structured packing module 100 may be included in a gas phase reactor.

The inner tube 5 may have a hollow or solid cylindrical shape, for example a right circular cylinder. The inner tube 5 may have a central axis $5x$ representing a longitudinal direction of the inner tube 5 which may also be understood as longitudinal direction of the structured packing module 1. The inner tube 5 has an outer circumferential surface $5b$, and may have an inner circumferential surface $5a$.

In one example, the inner tube 5 may be formed as a hollow cylinder having uniform thickness of the wall of the cylinder.

The plurality of corrugated sheets 10, 20, 30 for example may include a first corrugated sheet 10, a second corrugated sheet 20 disposed radially outwards of the first corrugated sheet 10, and a third corrugated sheet 30 disposed radially outwards of the second corrugated sheet 20. It may be noted that the drawing figures depict three such corrugated sheets, for exemplary purposes only. The number of corrugated sheets may be less than three for example two, or more than three for example four, five, six, and so on and so forth. The explanation or features provided in the present disclosure, as well as the drawing figures are equally applicable to any number of corrugated sheets.

Each corrugated sheet 10, 20, 30 may be arranged circumferentially around the inner tube 5, and may completely encircle the inner tube 5 as shown in FIGS. 1-4.

The corrugated sheets 10, 20, 30 may be disposed outside, i.e., radially outwards of the inner tube 5 as shown in FIGS. 1-4. When the structured packing module 100 includes the outer sleeve 55, as shown in FIGS. 3 and 4, the corrugated sheets 10, 20, 30 may be disposed in the annular space 50.

Figure 9:
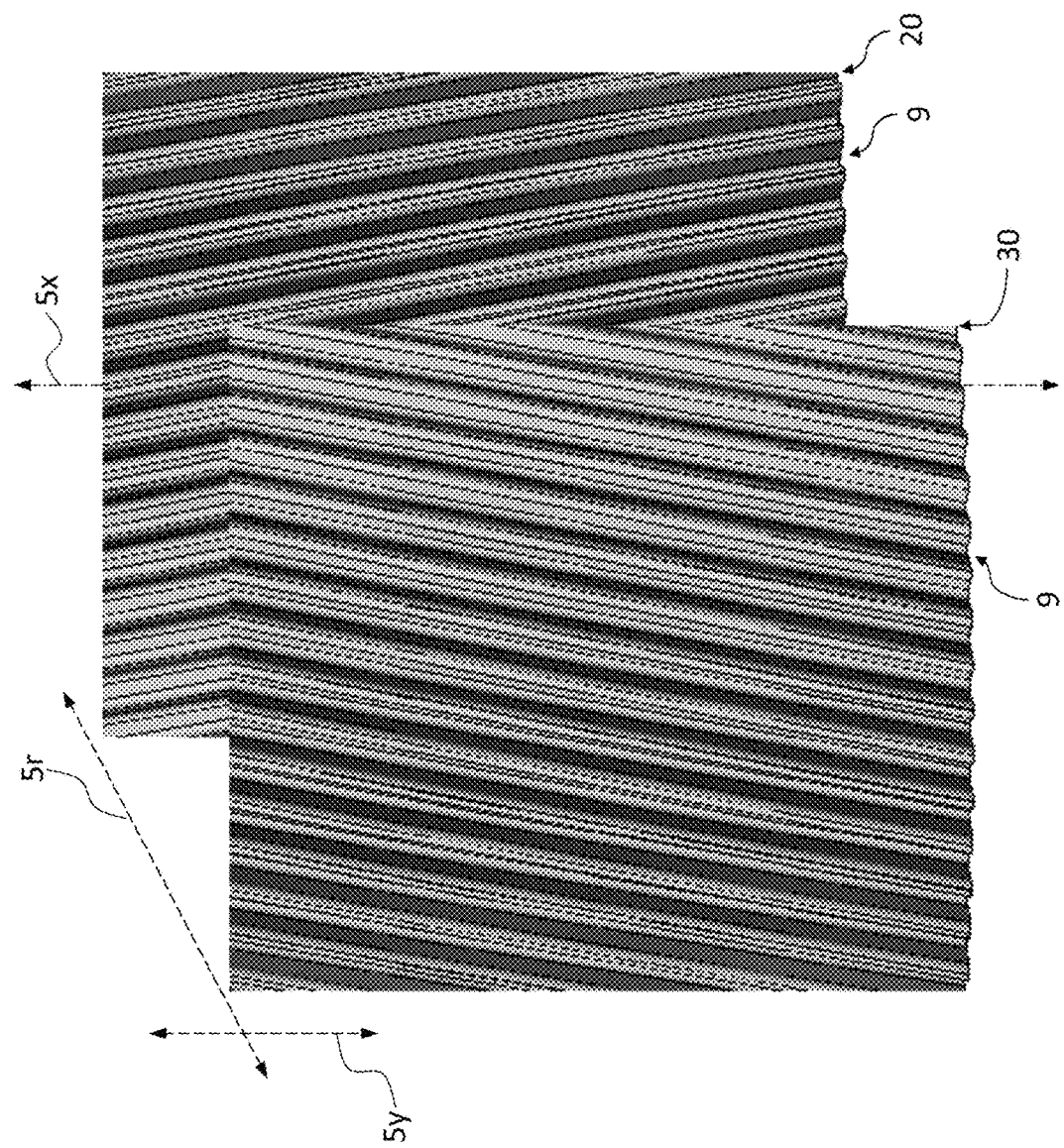
FIG. 9 illustrates an arrangement of the corrugated sheets of FIGS. 7 and 8.
Figure 10:
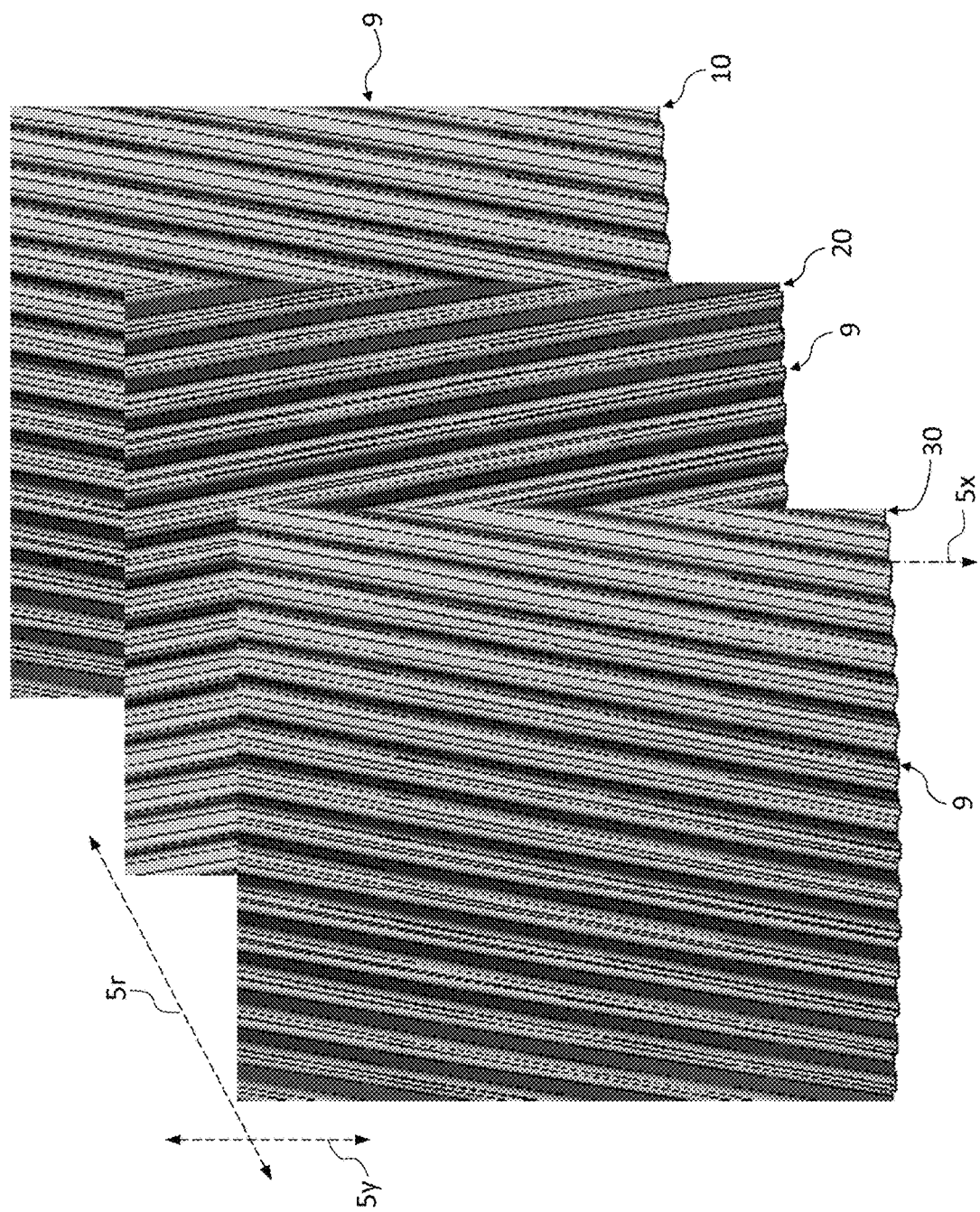
FIG. 10 illustrates an arrangement of the corrugated sheets of FIG. 9 with another corrugated sheet, directly adjacently disposed to the corrugated sheets of FIG. 9.

The corrugated sheets 10, 20, 30 may be arranged to overlap with each other along a radial direction 5r (shown in FIGS. 9 and 10). Each of the corrugated sheets 10, 20, 30 may be arranged to overlap along the radial direction with the outer circumferential surface 5b of the inner tube 5.

The adjacently disposed corrugated sheets 10, 20, 30 may be in direct contact each other, for example may be welded to each other. All the corrugated sheets 10, 20, 30 may be serially in direct contact with each other, for example in the radial direction.

The radially inner-most corrugated sheet 10, i.e., the first corrugated sheet 10 of the plurality of corrugated sheets 10, 20, 30 may be in direct contact with the inner tube 5, e.g., with the outer circumferential surface 5b, for example may be welded to the inner tube 5.

The radially outer-most corrugated sheet 30, i.e., the third corrugated sheet 30 of the plurality of corrugated sheets 10, 20, 30 may be in direct contact with the outer tube 55, e.g., with the inner circumferential surface 55a, for example may be welded to the outer tube 55.

Each corrugated sheet 10, 20, 30 has a first end 101 and a second end 102 spaced apart from each other along the longitudinal direction. The inner tube 5 may have a first opening 51 and a second opening 52 at its two longitudinal ends, the first opening 51 and the second opening 52 are spaced apart longitudinally. Optionally, the first ends 101 of the corrugated sheets 10, 20, 30 may be aligned with the first opening 51, and/or the second ends 102 of the corrugated sheets 10, 20, 30 of same or different structured packing (when there are plurality of structured packing as shown in FIGS. 14C and D) may be aligned with the second opening 52. For example, when the structured packing module 100 is disposed vertically, the first ends 101 may be horizontally or laterally aligned (i.e., may be at the same horizonal level) with the first opening 51 and/or the second ends 102 of same or different structured packing (when there are plurality of structured packing as shown in FIGS. 14C and D) may be horizontally or laterally aligned with the second opening 52 of the inner tube 5.

The outer tube 55 may have a first opening 551 and a second opening 552 at its two longitudinal ends, the first opening 551 and the second opening 552 are spaced apart longitudinally. Optionally, the first ends 101 of the corrugated sheets 10, 20, 30 may be aligned with the first opening 551, and/or the second ends 102 of the corrugated sheets 10, 20, 30 of same or different structured packing (when there are a plurality of structured packing as shown in FIG. 14D) may be aligned with the second opening 552 of the outer tube 55. For example, when the structured packing module 100 is disposed vertically, the first ends 101 may be horizontally or laterally aligned (i.e., may be at the same horizonal level) with the first opening 551 and/or the second ends 102 of same or different structured packing (when there are plurality of structured packing as shown in FIG. 14D) may be horizontally or laterally aligned with the second opening 552 of the outer tube 55.

Optionally, the first opening 51 and/or the second opening 52 of the inner tube 5 may be aligned with the first opening 551 and/or the second opening 552 of the outer tube 55. For example, when the structured packing module 100 is disposed vertically, the first opening 51 and/or the second opening 52 of the inner tube 5 may be horizontally or laterally aligned with the first opening 551 and/or the second opening 552 of the outer tube 55.

The corrugated sheets 10, 20, 30 may be formed of a metallic material, for example a metal or a metallic alloy or Fecralloy or Nickel or Stainless Steel or a combination thereof.

A surface of the corrugated sheet 10, 20, 30 may be coated with at least one catalyst (not shown). For example, a radially-inward facing surface 11 of the first corrugated sheet 10 and/or a radially-outward facing surface 12 of the first corrugated sheet 10 may be coated with one or more catalysts. Similarly, a radially-inward facing surface 21 of the second corrugated sheet 20 and/or a radially-outward facing surface 22 of the second corrugated sheet 20 may be coated with the one or more catalysts. Furthermore, a radially-inward facing surface 31 of the third corrugated sheet 30 and/or a radially-outward facing surface 32 of the third corrugated sheet 30 may be coated with the one or more catalysts.

The radially-inward facing surface 11, 21, 31 and/or the radially-outward facing surface 12, 22, 32 of the corrugated sheet 10, 20, 30 may be smooth or textured.

Each corrugated sheet 10, 20, 30 may be formed by crimping or corrugating a flat sheet or foil to create corrugations 9.

The corrugations 9 on each sheet 10, 20, 30 extend between the first end 101 and the second end 102 of each corrugated sheet. The corrugations 9 are disposed at an acute angle A (shown in FIGS. 11 and 12) with respect to a line $5y$ parallel to the central axis $5x$.

The corrugations 9 are schematically depicted in FIG. 1 which shows crests $9c$ and troughs $9t$ alternatingly disposed along the circumferential direction. The solid lines $9c$ depict the crests and the dotted lines $9p$ depict the troughs—which together referred to as the corrugations 9.

Figure 6:
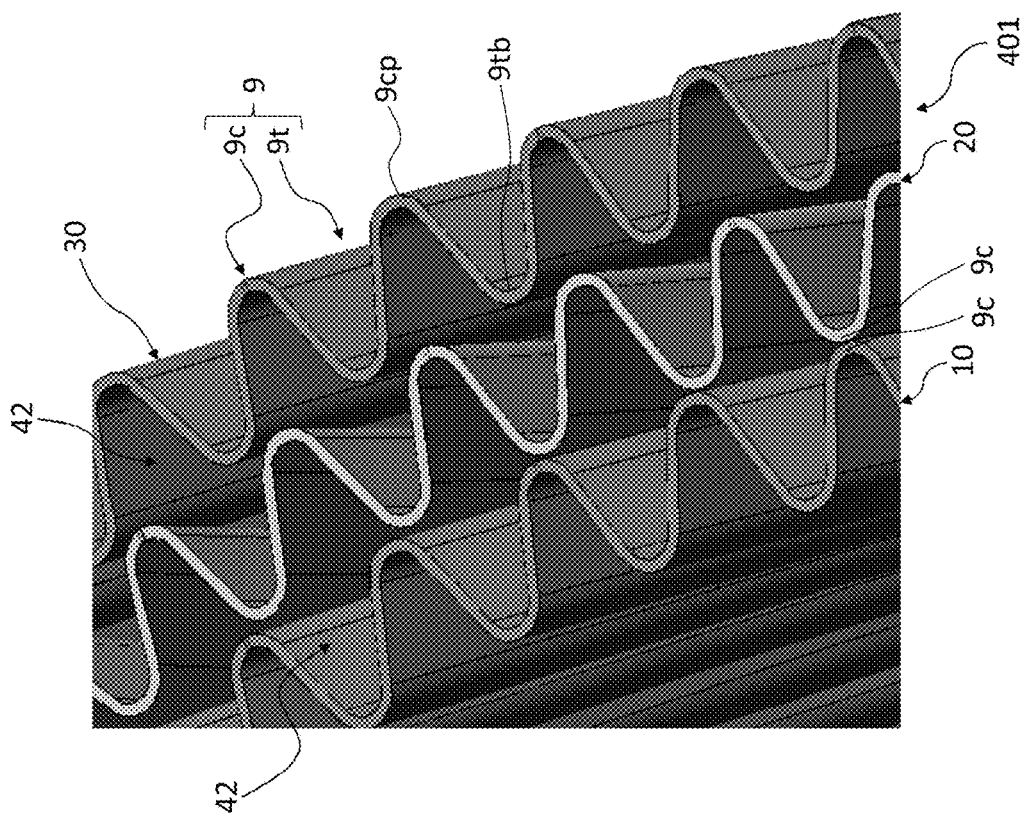
FIG. 6 illustrates area M of FIG. 5.
Figure 5:
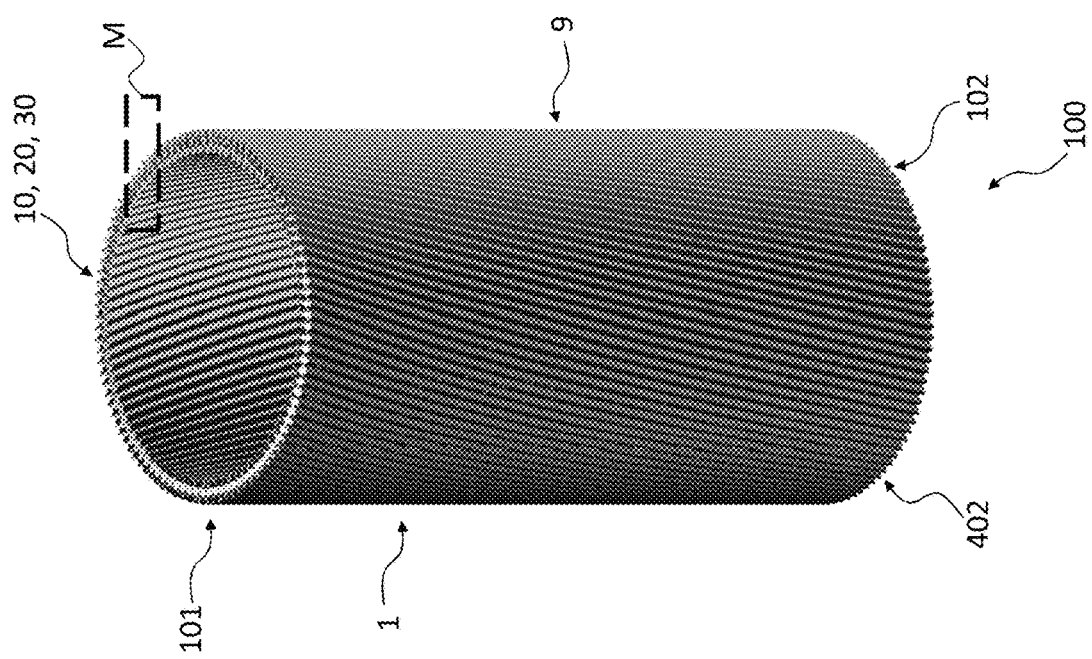
FIG. 5 illustrates a perspective view of yet another structured packing module having only corrugated sheets, i.e., without an inner tube and an outer tube.

FIG. 5 shows the structured packing module having only the corrugated sheets 10, 20, 30 without the inner tube 5. FIG. 6 shows the area marked M on FIG. 5 to show the relative arrangement of the corrugations of the corrugated sheets 10, 20, 30. Each of FIGS. 5 and 6 show the corrugations 9 on each corrugated sheet 10, 20, 30 of the plurality, having crests $9c$ and troughs $9p$. The corrugated sheet 10, 20, 30 may be uniformly corrugated, i.e., may include corrugations with same opening angle, same height and same numerical value or degree of inclination (i.e., same numerical value or degree of the acute angle A).

The corrugated sheets 10, 20, 30 are arranged to radially overlap with each other such that the corrugations 9 of adjacently disposed corrugated sheets 10, 20, 30 are arranged in a crisscross relationship (a pattern of intersecting straight lines), when viewed radially.

Figure 8:
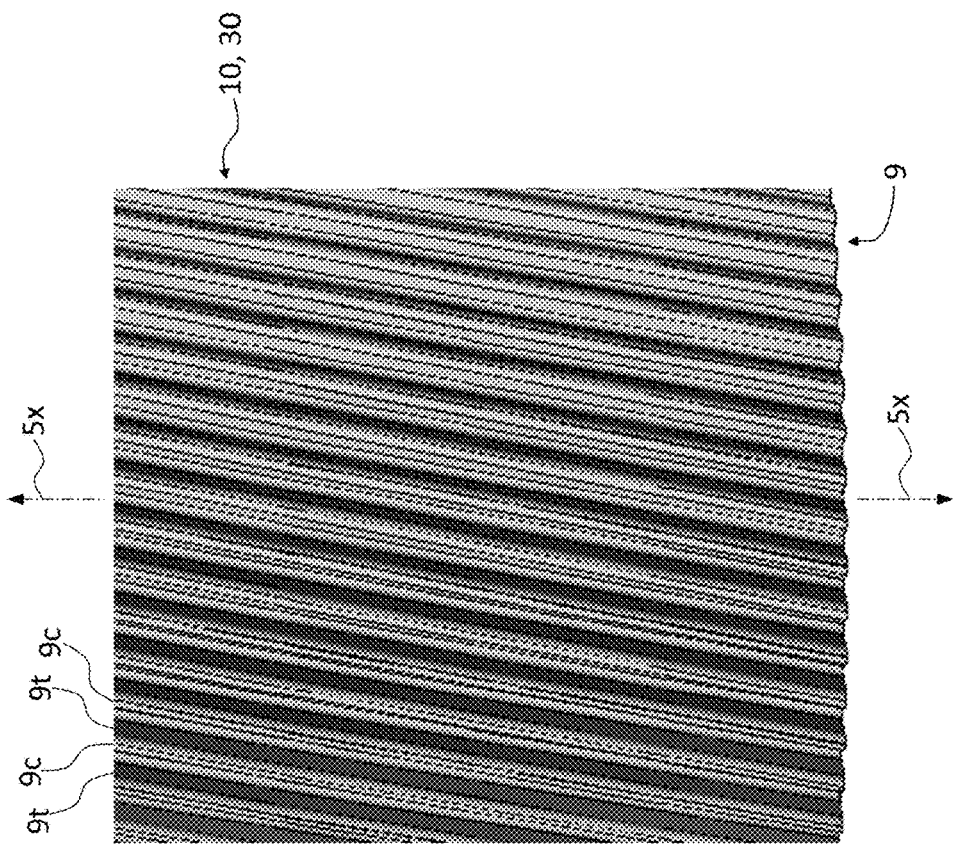
FIG. 8 illustrates a part of another corrugated sheet, directly adjacently disposed to the corrugated sheet of FIG. 7, when view in radially inwards direction of the corrugated sheets of FIG. 5.
Figure 7:
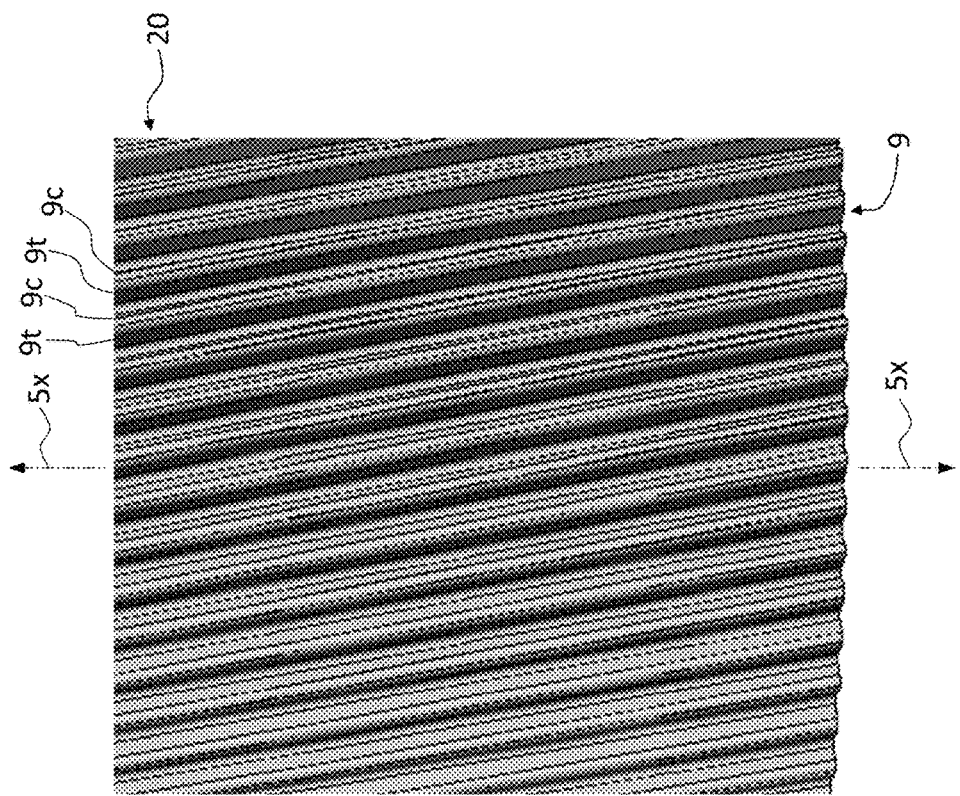
FIG. 7 illustrates a part of a corrugated sheet when view in radially inwards direction of the corrugated sheets of FIG. 5.

FIGS. 7 and 8 illustrates parts of pair of adjacent of corrugated sheets 20 (in FIG. 7) and 10 or 30 (FIG. 8) when view in radially inwards direction. FIG. 9 illustrates an arrangement of the corrugated sheets 20 and 30 of FIGS. 7 and 8 to form the crisscross relationship of the corrugations 9. FIG. 10 depicts arrangement scheme for three corrugated sheets 10, 20 and 30.

The first and the third corrugated sheets 10, 30 are arranged to radially overlap with each other such that the corrugations 9 of the first and the third corrugated sheets 10, 30 are in parallel relation with each other. The second corrugated sheet 20 is arranged to radially overlap with the first and the third corrugated sheets 10, 30 such that the corrugations 9 of the second corrugated sheet 20 are in a crisscross relationship with the corrugations 9 of the first and the third corrugated sheets 10, 30.

As shown in FIGS. 7 and 8, the direction of inclination of corrugations is reversed for each pair of adjacent sheets 10, 20, 30. For example, when considering a pair of corrugated sheets 20, 10 or 30 being viewed from one point along the radial direction (e.g. radially inwards)—if in the corrugated sheet 20 the corrugations 9 are arranged such that a part of the crest 9c or trough 9t arranged closer to the first end 101 is displaced in clockwise direction compared to a part of the crest 9c or trough 9t arranged closer to the second end 102, then in the adjacent corrugated sheet 10, 30 the corrugations 9 are arranged such that a part of the crest 9c or trough 9t arranged closer to the first end 101 is displaced in counter-clockwise direction compared to a part of the crest 9c or trough 9t arranged closer to the second end 102—for example as depicted in FIGS. 9 and 10.

The corrugated sheets 10, 20, 30 are arranged to radially overlap with each other such that the crests 9c of adjacently disposed pair of corrugated sheets 10, 20, 30 are arranged in a crisscross relationship (a pattern of intersecting straight lines), when viewed radially.

The corrugated sheets 10, 20, 30 are arranged to radially overlap with each other such that the troughs 9t of adjacently disposed pair of corrugated sheets 10, 20, 30 are arranged in a crisscross relationship (a pattern of intersecting straight lines), when viewed radially.

The crisscross pattern may be a rhombus pattern, i.e. an array of rhombus shapes may be defined or visualized by the overlapping corrugations of the adjacent sheets 10, 20, 30, more precisely by the overlapping crests 9c of each pair of the adjacent sheets 10, 20, 30 and/or by the overlapping troughs 9t of each pair of the adjacent sheets 10, 20, 30.

The structured packing module 100 includes a gas flow path 40.

The gas flow path 40 may include at least one inter-sheet gas flow path 42 defined between the adjacently disposed corrugated sheets 10, 20, 30.

The gas flow path 40 may include an inner gas flow path 44 defined between the corrugated sheet 10 disposed at radially innermost position in the plurality of corrugated sheets 10, 20, 30.

The gas flow path 40 may include an outer gas flow path 46 defined between the corrugated sheet 30 disposed at radially outermost position in the plurality of corrugated sheets 10, 20, 30.

Figure 12:
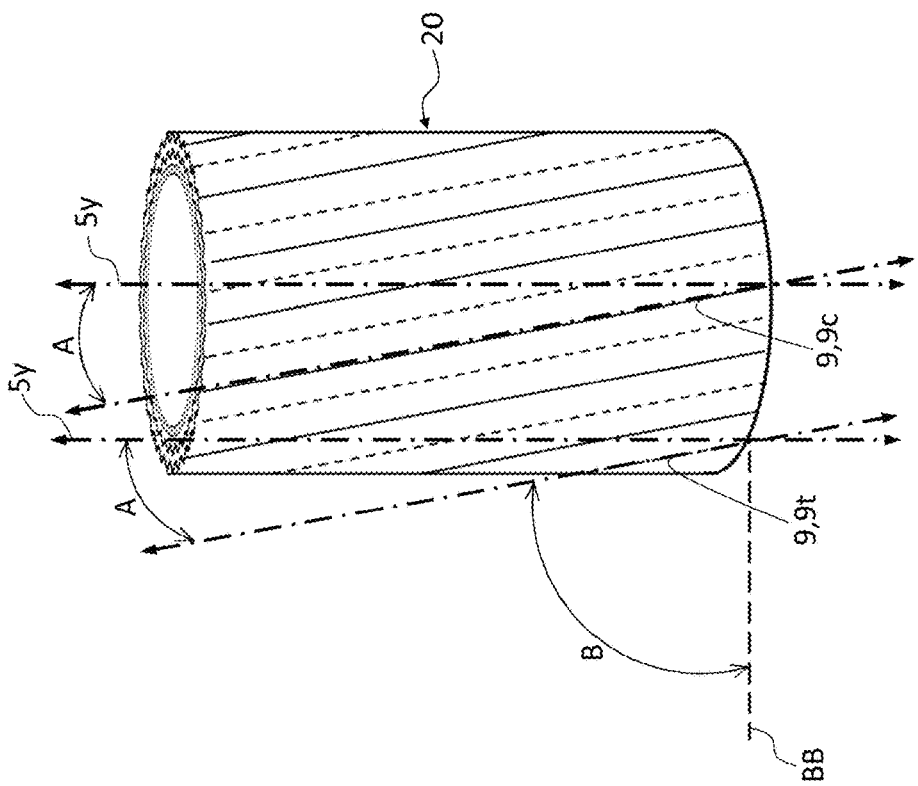
FIG. 12 schematically illustrates a perspective view of an exemplary structured packing module according to the present technique showing an acute angle of the corrugations of a neighboring corrugated sheet, directly adjacently disposed radially inward to corrugated sheet of FIG. 11.
Figure 11:
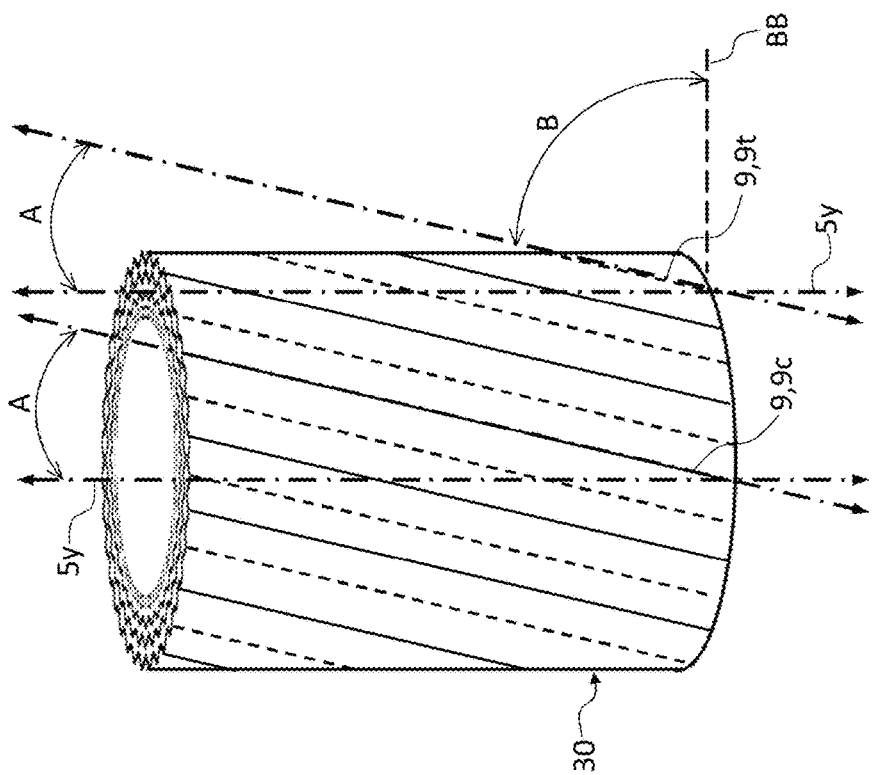
FIG. 11 schematically illustrates a perspective view of an exemplary structured packing module according to the present technique showing an acute angle of the corrugations of one of the corrugated sheets.

FIGS. 11 and 12 show the acute angle A of the corrugations 9 of one (say the third corrugated sheet 30) of the corrugated sheets 10, 20, 30 and another (say the second corrugated sheet 20) of the corrugated sheets 10, 20, 30 of a pair of corrugated sheets 20, 30.

As shown in FIGS. 11 and 12, the corrugations 9 are disposed at an acute angle A with respect to a line 5y parallel to the central axis 5x. The acute angle is greater than or equal to 5 degree and less than or equal to 30 degrees. To explain further, when the central axis 5x is aligned vertically, then an angle B, say corrugations-horizontal plane angle B, formed between a horizontal plane BB and the corrugations 9 may be greater than or equal to 60 degree and less than or equal to 85 degrees.

For a pair of adjacently disposed corrugated sheets, the corrugations-horizontal plane angle B may be measured from the horizontal plane BB in counterclockwise sense for one of the adjacently disposed corrugated sheets—for example as shown in FIG. 11 and the corrugations-horizontal plane angle B may be measured from the horizontal plane BB in clockwise sense for another of the adjacently disposed corrugated sheets—for example as shown in FIG. 12.

The acute angle A may be greater than or equal to 5 or 10 degree and less than or equal to 15 or 20 degrees. In other words, when the central axis 5x is aligned vertically, then the corrugations-horizontal plane angle B may be greater than or equal to 70 or 75 degrees, and less than or equal to 80 or 85 degrees.

The acute angle A may be 10 degrees. In other words, when the central axis 5x is aligned vertically, then the corrugations-horizontal plane angle B may be 80 degrees.

The acute angle A may be 5 degrees. In other words, when the central axis 5x is aligned vertically, then the corrugations-horizontal plane angle B may be 85 degrees.

Figure 13:
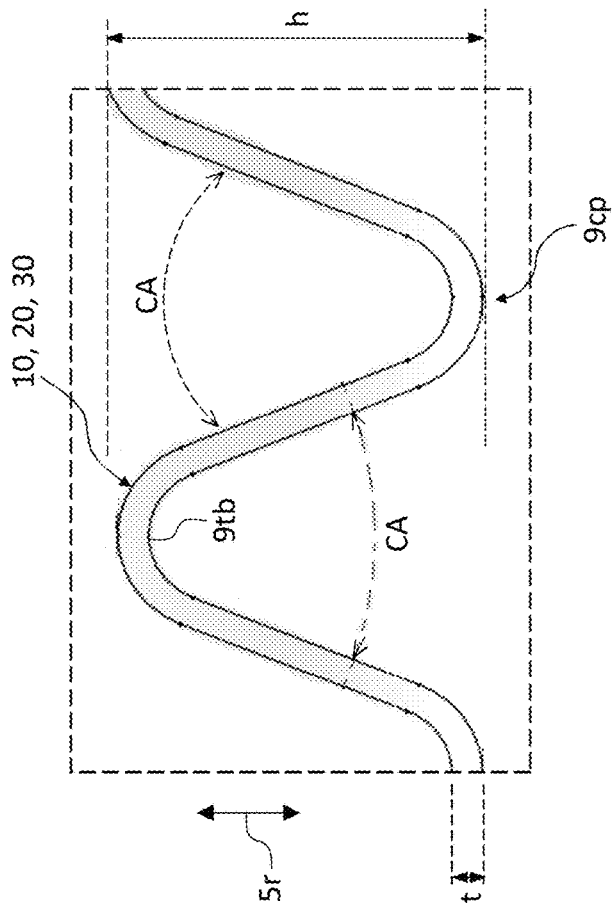
FIG. 13 schematically illustrates an axial view of corrugations of the corrugated sheet.

FIG. 13 schematically illustrates an axial view of corrugations 9 of the corrugated sheet 10, 20, 30.

As shown in FIG. 13, a crimp angle CA of the corrugations 9 may be less than equal to 60 degrees; preferably may be less than equal to 45 degrees.

The crimp angle CA of the corrugations 9 may be greater than equal to 40 degrees.

The crimp angle CA may be measured between facing parts of surface of the corrugated sheet 10, 20, 30 that (the facing parts) define the trough 9t. The crimp angle CA is measured across an opening of the trough 9t.

As shown in FIG. 13, and also in FIG. 6, the crests 9c and the troughs 9t of the corrugations 9 may be contiguously parallelly disposed, i.e., side-by-side along a length direction of the crests 9c and the troughs 9t.

Optionally, peaks 9cp of the crests 9c and/or bottoms 9bt of the troughs 9t may have a rounded shape—which may be beneficial for uniform gas flow.

A thickness t of the corrugated sheet 10, 20, 30 may be greater than or equal to 0.1 millimeter and less than or equal to 0.2 millimeter. A height h (radially measured) of the corrugations 9 of the corrugated sheet 10, 20, 30 may be greater than or equal to 1 millimeter and less than or equal to 2 millimeters, preferably 1.8 millimeters. FIGS. 14A-D show a height H1 (axially measured) of the corrugated sheets 10, 20, 30 and/or of the structured packing, and a height H of the inner tube 5.

Figure 14A:
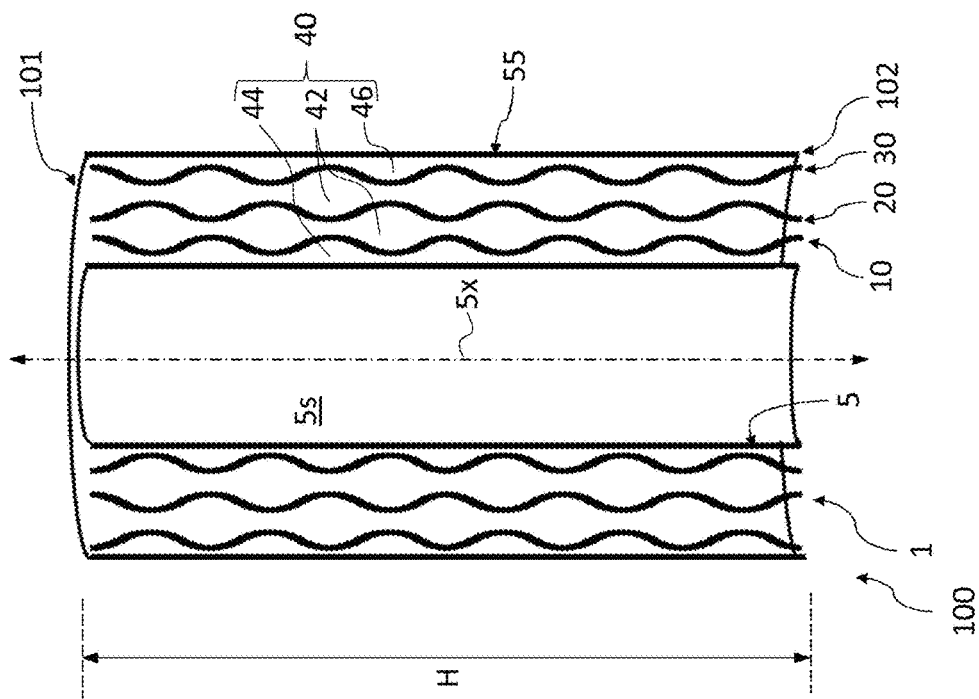
FIGS. 14A-D schematically illustrate vertical cross-sectional views of various exemplary structured packing modules having the structured packing.
Figure 14D:
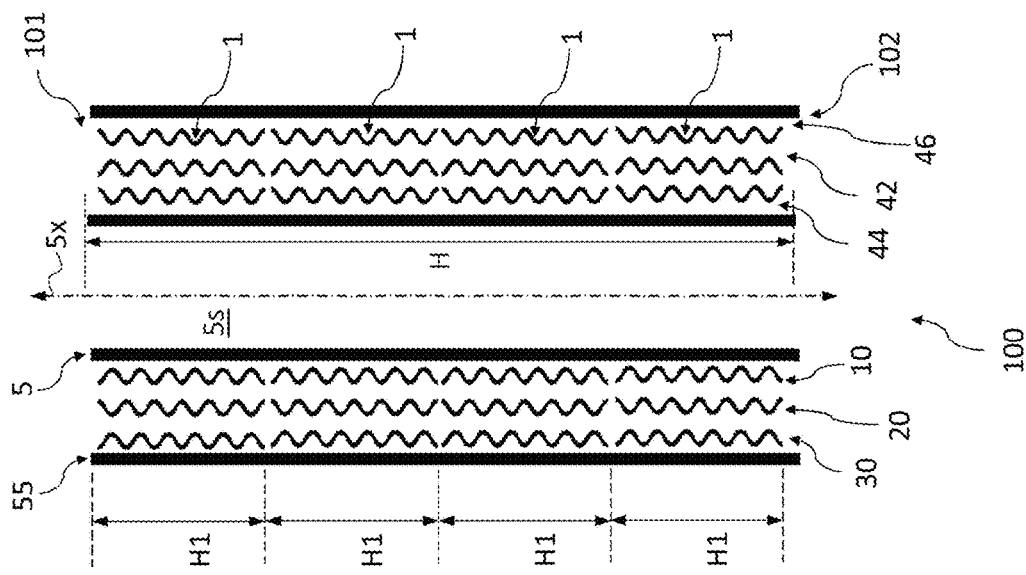
Figure 14C:
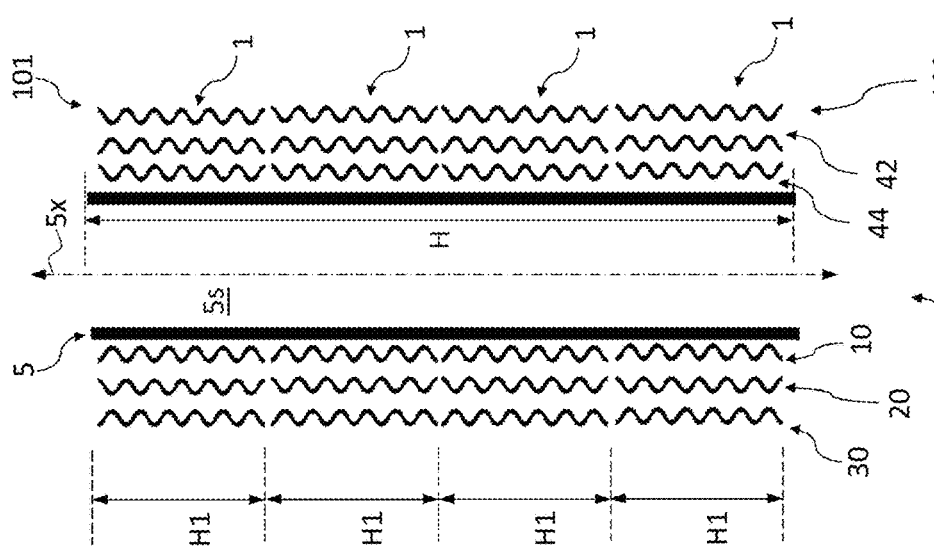

As shown in FIG. 14A, the height of the structured packing, i.e., the corrugated sheets may be same as the height of the inner and/or the outer tubes.

Alternatively, the height of the of the structured packing, i.e., the corrugated sheets may be different than the height of the inner and/or the outer tubes.

Figure 14B:
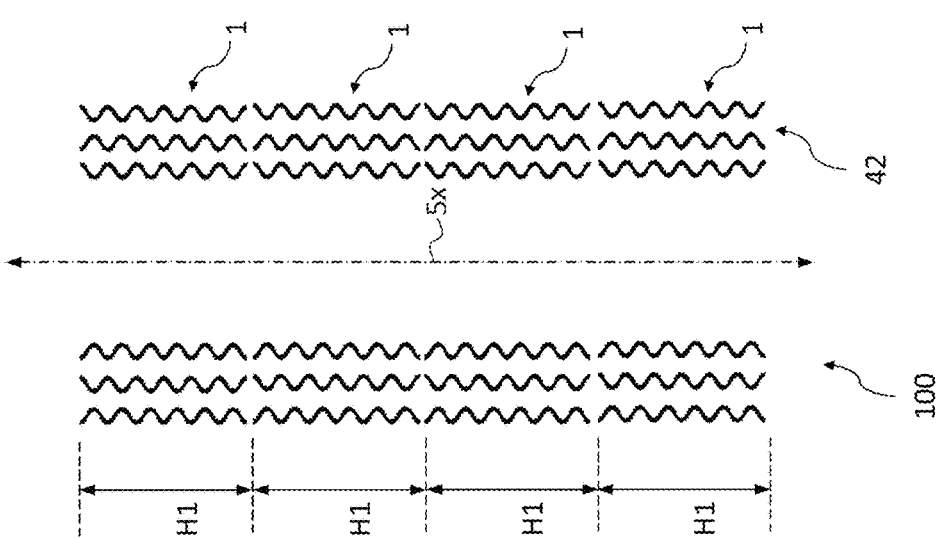

For example, as exemplarily shown in FIGS. 14B-14D, the height H1 of the corrugated sheet, i.e. of the structured packing may be greater than or equal to 150 millimeters (mm) and less than or equal to 370 mm, preferably may be 200 mm.

Each of the corrugated sheets 10, 20, 30 of the structured packing 1 may have the same height H1.

The height H of the inner tube 5 and/or the outer tube 55 may be greater than or equal to 0.5 meter and less than or equal to 12 meters, for example may be greater than or equal to 1 meter and less than or equal to 12 meters.

As shown in FIG. 14B, the structured packing module 100 may include plurality of structured packings 1, stacked atop each other along the longitudinal direction 5x. The central axes 5x of each of the structured packings 1 may be aligned with each other (coaxially aligned) to form one structured packing module. Adjacent structured packings 1, along the longitudinal direction, may be in direct contact with each other. The corrugated sheets 10, 20, 30 of one structured packing 1 may be serially arranged along the longitudinal direction with corrugated sheets 10, 20, 30 of adjacent structured packing 1, preferably in direct contact with each other.

As shown in FIG. 14C, the structured packing module 100 may include plurality of structured packings 1, stacked atop each other along the longitudinal direction 5x radially outwards of the inner tube 5. The central axes 5x of each of the structured packings 1 may be aligned with each other (coaxially aligned) and with the central axis 5x of the inner tube 5 to form one structured packing module 1. Adjacent structured packings 1, along the longitudinal direction, may be in direct contact with each other. The corrugated sheets 10, 20, 30 of one structured packing 1 may be serially arranged along the longitudinal direction with corrugated sheets 10, 20, 30 of adjacent structured packing 1, preferably in direct contact with each other. Each of the structured packings, i.e., the inner-most corrugated sheet 10 of each structured packing 1, may be in direct contact with the inner tube 5.

As shown in FIG. 14D, the structured packing module 100 may include a plurality of structured packings 1, stacked atop each other along the longitudinal direction 5x radially outwards of the inner tube 5 and inwards of the outer tube 55. In other words, in the annular space defined between the inner and the outer tube 5, 55, a plurality of structured packings may be arranged atop each other, i.e., along the longitudinal direction. The central axes 5x of each of the structured packings 1 may be aligned with each other (coaxially aligned) and with the central axes of the inner and the outer tubes 5, 55 to form one structured packing module 100. Adjacent structured packings 1, along the longitudinal direction, may be in direct contact with each other. The corrugated sheets 10, 20, 30 of one structured packing 1 may be serially arranged along the longitudinal direction with corrugated sheets 10, 20, 30 of adjacent structured packing 1, preferably in direct contact with each other. For each of the structured packings, i.e., the inner-most corrugated sheet 10 of each structured packing 1, may be in direct contact with the inner tube 5, and the outer-most corrugated sheet 30 of each structured packing 1, may be in direct contact with the outer tube 55. As aforementioned, for each of the structured packings, i.e., the corrugated sheets 10, 20, 30 may be in direct contact with each other.

A surface area of the corrugated sheet 10, 20, 30, including both surfaces 11, 12, 21, 22, 31, 32 may be greater than or equal to 750 m2/m3, and/or less than or equal to 1900 m2/m3, preferably equal to 1200 m2/m3.

Referring to FIG. 6, further optional details of arrangement of the corrugated sheets 10, 20, 30 is discussed. The first ends 101 of the corrugated sheets 10, 20, 30 define an input end 401 of the gas flow path 40, i.e., an end where the input feed of reactants is received. The first ends 101 of at least one pair of adjacently disposed corrugated sheets 10, 20, 30 may be arranged such that crests 9c of one of the adjacently disposed corrugated sheets 10, 20, 30 is in contact with troughs 9t of other of the adjacently disposed corrugated sheets 10, 20, 30.

FIGS. 15-17 show different arrangement schemes for the structured packing module 100 in a gas phase reactor 2, i.e., in a shell of the gas phase reactor 2.

The gas phase reactor 2 for example a reactor tank or shell of the gas phase reactor 2 may include one or more of the structured packing modules 100, for example two or more structured packing modules 100. The structured packing module 100 may be as discussed hereinabove with reference to FIGS. 1-14 and thus, the description is not repeated.

The central axis 5x of the inner tube 5 of the structured packings 1 may be vertically disposed in the gas phase reactor 2.

When a plurality of structured packing modules 100 are disposed in the reactor 2 as shown in FIGS. 15-17, the central axes 5x of the inner tubes 5 of the structured packing modules 100 may be disposed parallel to each other. The structured packing module 100 may be formed as a single horizontal array, i.e., all the structured packing overlap with each other horizontally—as shown in FIGS. 15 and 16. Simply put, the structured packing modules 100 may be disposed horizontally next to each other.

Additionally or alternatively, as shown in FIG. 17, one or more of the structured packing modules 100 may be disposed atop one or more of the structured packing modules 100. Each structured packing module 100 disposed atop another structured packing module 100 may form a column of serially disposed (in longitudinal direction) structured packing modules 100, such that the gas flow paths 40 and/or the central axis 5x of the structured packing modules 100 are longitudinally aligned with each other.

FIGS. 18(A)-18(D) show various flow scheme implemented with the structured packing module 100.

In each of the FIGS. 18 (A)-(D), arrows marked with reference sign R shows a direction of flow of the reactant R into the structured packing module 100, and arrows marked with reference sign P shows a direction of flow of the product P, reference sign 401 shows an input end of the gas flow path 40, i.e. where the reactants enter the structured packing module 100, and 402 shows an output end of the structured packing, i.e. where the product P is directed out of the structured packing module 100.

Figure 18D:
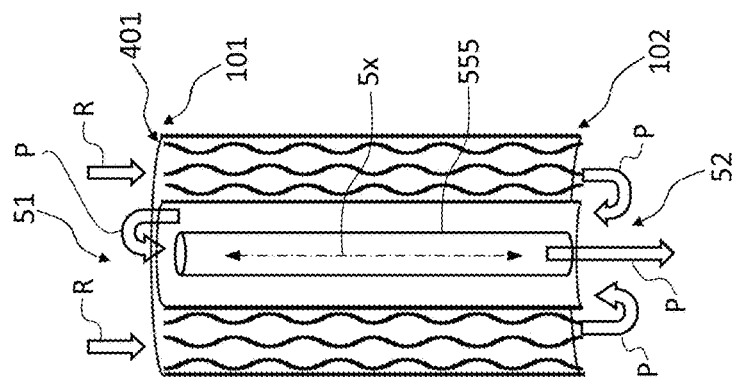
FIGS. 18A-D schematically illustrate various flow schemes for reactants and the product through the structured packing module; in accordance with aspects of the present technique.
Figure 18C:
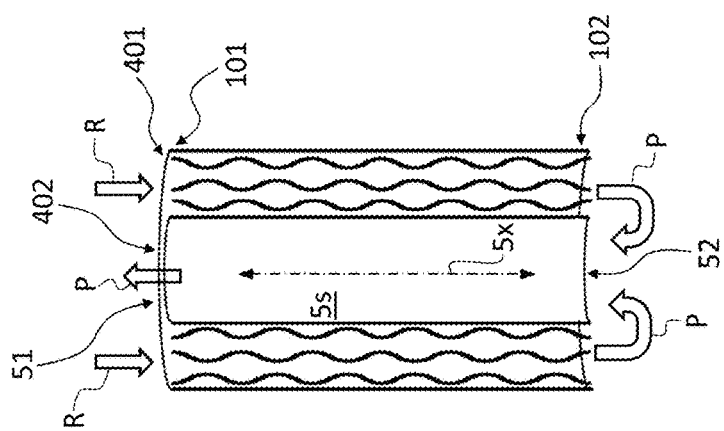
Figure 18B:
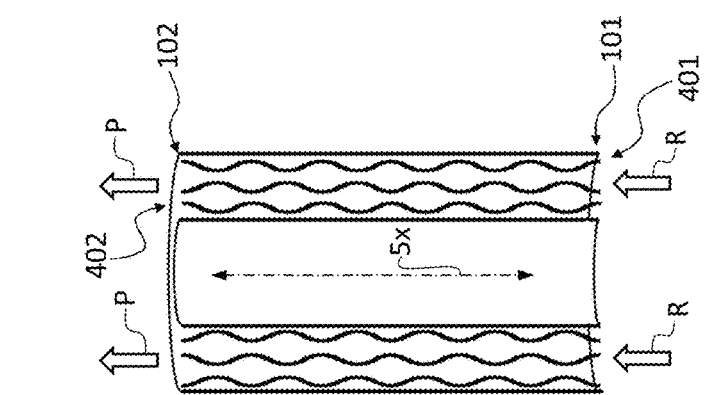
Figure 18A:
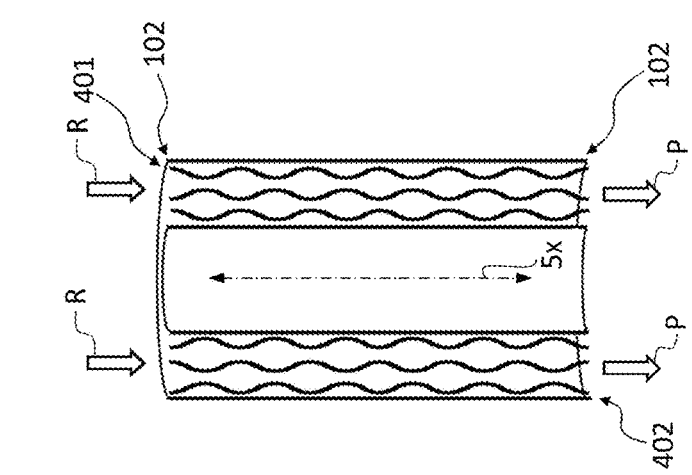

As shown in FIG. 18(A), the one or more of the structured packing modules 100 may be arranged in the reactor 2 such that input end 401 is disposed vertically upwards of the output end 402, i.e., input end 401 is formed at the first end 101, and the output end 402 is formed at the second end 102. The first end 101 is vertically atop the second end 102. The reactants R flow into the structured packing module 100 in vertically downward direction and the product P flows out of the structured packing module from the longitudinally opposite end 402 or 102.

As shown in FIG. 18(B), the one or more of the structured packing modules 100 may be arranged in the reactor 2 such that input end 401 is disposed vertically downwards of the output end 402, i.e. input end 401 is formed at the first end 101, and the output end 402 is formed at the second end 102. The first end 101 is vertically below or beneath the second end 102. The reactants R flow into the structured packing 1 in vertically upward direction and the product P flows out of the structured packing module from the longitudinally opposite end 402 or 102.

In short, an inlet end 401 and an outlet of the structured packing module 100 may be disposed or formed such that the flow directions of the reactants R and the product P are same.

As shown in FIG. 18(C), the one or more of the structured packing modules 100 may be arranged in the reactor 2 such that input end 401 is disposed adjacent, e.g., laterally adjacent, of the output end 402, i.e. input end 401 and the output end 402 are both formed at the first end 101. The first end 101 may be vertically atop the second end 102 as shown in FIG. 18(C), or may be vertically below the second end 102 (not shown). The reactants R flow into the structured packing module 100 in at the first end 101 and then continue to the second end 102, and at the second end 102 make an about turn into the inner space 5s of the inner tube 5 and flow out of the structured packing module 100 in direction opposite to the direction of entry or input or inlet of the reactant.

As shown in FIG. 18(D), the one or more of the structured packing modules 100 may further include an innermost tube or sleeve 555. The innermost tube or sleeve 555 may be disposed inside the inner tube 5, preferably coaxially. The product gas P after exiting from the first opening 101 may make an about-turn or U-turn to enter an opening of the innermost tube 555 disposed in the first opening 101 and then flow in the innermost tube 555 towards longitudinally opposite end of the innermost tube 555.

The invention claimed is:

1. A structured packing module for a gas phase reactor, comprising a cylindrical shaped structured packing having a central axis extending along a longitudinal direction, wherein the structured packing comprises:
  a plurality of corrugated sheets, each corrugated sheet extending circumferentially around the central axis and having a first end and a second end spaced apart from each other along the longitudinal direction;
  wherein each corrugated sheet comprises corrugations extending between the first end and the second end and disposed at an acute angle with respect to a line parallel to the central axis, wherein the acute angle is greater than or equal to 5 degrees and less than or equal to 30 degrees;
  wherein the corrugated sheets are arranged to radially overlap with each other such that the corrugations of adjacently disposed corrugated sheets are arranged in a crisscross relationship; and
  wherein the structured packing module comprises a gas flow path comprising at least one inter-sheet gas flow path defined between the adjacently disposed corrugated sheets.

2. The structured packing module according to claim 1, wherein the adjacently disposed corrugated sheets are in direct contact with each other.

3. The structured packing module according to claim 1, further comprising:
  an inner tube extending along the longitudinal direction and arranged coaxially with the structured packing, wherein each of the plurality of corrugated sheets is arranged radially outward of and circumferentially around the inner tube.

4. The structured packing module according to claim 3, further comprising an outer tube coaxially arranged with the inner tube and radially spaced apart from the inner tube to define an annular space therebetween, wherein the gas flow path is defined in the annular space and the plurality of corrugated sheets are disposed in the annular space.

5. The structured packing module according to claim 1, wherein a surface of the corrugated sheet is coated with at least one catalyst.

6. The structured packing module according to claim 1, wherein the acute angle is less than or equal to 20 degrees.

7. The structured packing module according to claim 1, wherein the corrugations comprise a plurality of alternatingly arranged and linearly extending crests and troughs extending from the first end up to the second end.

8. The structured packing module according to claim 1, wherein a crimp angle of the corrugations is less than equal to 60 degrees.

9. The structured packing module according to claim 1, wherein the plurality of corrugated sheets at least comprises a first corrugated sheet, a second corrugated sheet disposed radially outwards of the first corrugated sheet, and a third corrugated sheet disposed radially outwards of the second corrugated sheet; and
  wherein the first and the third corrugated sheets are arranged to radially overlap with each other such that the corrugations of the first and the third corrugated sheets are in parallel relation with each other.

10. The structured packing module according to claim 1, wherein the first ends of the corrugated sheets define an input end of the gas flow path, and wherein the first ends of the adjacently disposed corrugated sheets are arranged such that crests of one of the adjacently disposed corrugated sheets is in contact with troughs of other of the adjacently disposed corrugated sheets.

11. The structured packing module according to claim 1, wherein the crests and the troughs of the corrugations are contiguously disposed and wherein peaks of the crests and/or bottoms of the troughs have a rounded shape.

12. The structured packing module according to claim 1,
  wherein a material of the corrugated sheets comprises at least one of metal, a metallic alloy, Fecralloy, Nickel, Stainless Steel and a combination thereof;
  wherein a thickness of the corrugated sheet is greater than or equal to 0.1 millimeter and less than or equal to 0.2 millimeter;
  wherein a height of the corrugations of the corrugated sheet is greater than or equal to 1 millimeter and less than or equal to 2 millimeters; and
  wherein a surface area of the corrugated sheet is greater than or equal to 750 $m^2/m^3$.

13. A gas phase reactor comprising at least one structured packing module, wherein the at least one structured packing module is according to claim 1.

14. The gas phase reactor according to claim 13, including an inner tube extending along the longitudinal direction and arranged coaxially with the structured packing, wherein:
  each of the plurality of corrugated sheets is arranged radially outward of and circumferentially around the inner tube;
  a radially inner-most corrugated sheet of the plurality of corrugated sheets is in direct contact with the inner tube;
  the inner tube comprises a first opening adjacent to the first ends of the corrugated sheets and a second opening adjacent to the second ends of the corrugated sheets;
  the first ends of the corrugated sheets form an input end of the at least one structured packing, the input end disposed radially outwards of the inner tube and configured to receive at least one reactant gas as an input feed into the at least one structured packing such that the at least one reactant gas flows from the first ends towards the second ends of the corrugated sheets; and the second opening of the inner tube is configured to receive at least one product gas exiting at the second ends of the corrugated sheets such that the at least one product gas flows from the second opening towards the first opening of the inner tube.

15. The gas phase reactor according to claim 13, wherein:
the central axis of the at least one structured packing is vertically disposed in the gas phase reactor;
the at least one structured packing comprises a plurality of structured packings and the central axes of the structured packings are disposed parallel to each other,
the first ends of the corrugated sheets of the structured packings are horizontally adjacent to each other; and
the first ends of the corrugated sheets are disposed at a position higher than the second ends of the corrugated sheets.

16. The gas phase reactor according to claim 13, wherein:
the central axis of the at least one structured packing is vertically disposed in the gas phase reactor; and
the at least one structured packing comprises a plurality of structured packings and the central axes of the structured packings are disposed parallel to each other and the first ends of the corrugated sheets of the structured packings are horizontally adjacent to each other.

17. The gas phase reactor according to claim 13, wherein:
the central axis of the at least one structured packing is vertically disposed in the gas phase reactor; and
the first ends of the corrugated sheets are disposed at a position higher than the second ends of the corrugated sheets.

18. The structured packing module according to claim 3, wherein a radially inner-most corrugated sheet of the plurality of corrugated sheets is in direct contact with the inner tube.

19. The structured packing module according to claim 1, wherein a radially-inward facing surface and/or a radially-outward facing surface of the corrugated sheet is smooth or textured.

20. The structured packing module according to claim 1, wherein:
the plurality of corrugated sheets at least comprises a first corrugated sheet, a second corrugated sheet disposed radially outwards of the first corrugated sheet, and a third corrugated sheet disposed radially outwards of the second corrugated sheet;
the first and the third corrugated sheets are arranged to radially overlap with each other such that the corrugations of the first and the third corrugated sheets are in parallel relation with each other; and
the second corrugated sheet is arranged to radially overlap with the first and the third corrugated sheets such that the corrugations of the second corrugated sheet are in a crisscross relationship with the corrugations of the first and the third corrugated sheets.

21. A structured packing module for a gas phase reactor, comprising a cylindrical shaped structured packing having a central axis extending along a longitudinal direction, wherein the structured packing comprises:
a plurality of corrugated sheets, each corrugated sheet extending circumferentially around the central axis and having a first end and a second end spaced apart from each other along the longitudinal direction;
wherein each corrugated sheet comprises corrugations extending between the first end and the second end and disposed at an acute angle with respect to a line parallel to the central axis, wherein the acute angle is greater than or equal to 5 degrees and less than or equal to 30 degrees;
wherein the corrugated sheets are arranged to radially overlap with each other such that the corrugations of adjacently disposed corrugated sheets are arranged in a crisscross relationship;
wherein the adjacently disposed corrugated sheets are in direct contact with each other;
wherein the corrugations comprise a plurality of alternatingly arranged and linearly extending crests and troughs extending from the first end up to the second end;
wherein the structured packing module comprises a gas flow path comprising at least one inter-sheet gas flow path defined between the adjacently disposed corrugated sheets; and
wherein the first ends of the corrugated sheets define an input end of the gas flow path, and wherein the first ends of the adjacently disposed corrugated sheets are arranged such that crests of one of the adjacently disposed corrugated sheets is in contact with troughs of other of the adjacently disposed corrugated sheets.

* * * * *